United States Patent
Hasegawa et al.

(10) Patent No.: US 8,320,953 B2
(45) Date of Patent: Nov. 27, 2012

(54) MOBILE TERMINAL DEVICE

(75) Inventors: Junichi Hasegawa, Kanagawa (JP);
Natsuhito Honda, Kanagawa (JP);
Yoshikazu Oda, Kanagawa (JP)

(73) Assignee: Kyocera Corporation, Kyoto (JP)

(*) Notice: Subject to any disclaimer, the term of this patent is extended or adjusted under 35 U.S.C. 154(b) by 470 days.

(21) Appl. No.: 12/523,317

(22) PCT Filed: Jan. 15, 2008

(86) PCT No.: PCT/JP2008/050381
§ 371 (c)(1),
(2), (4) Date: Nov. 11, 2009

(87) PCT Pub. No.: WO2008/087950
PCT Pub. Date: Jul. 24, 2008

(65) Prior Publication Data
US 2010/0113107 A1    May 6, 2010

(30) Foreign Application Priority Data

Jan. 15, 2007  (JP) ............... P2007-006411
Jan. 15, 2007  (JP) ............... P2007-006412
Jan. 16, 2007  (JP) ............... P2007-007374
Nov. 16, 2007  (JP) ............... P2007-298216

(51) Int. Cl.
*H04M 1/00*    (2006.01)

(52) U.S. Cl. ............... 455/550.1; 455/575.1; 455/575.3

(58) Field of Classification Search ........... 455/550.1, 455/575.1, 575.3, 574; 345/169; 713/323, 713/324
See application file for complete search history.

(56) References Cited

U.S. PATENT DOCUMENTS

| | | | |
|---|---|---|---|
| 7,031,743 B2 * | 4/2006 | Kawasaki et al. | 455/550.1 |
| 7,190,977 B2 * | 3/2007 | Hikishima | 455/566 |
| 2007/0298850 A1 | 12/2007 | Miyata et al. | |
| 2010/0317401 A1 * | 12/2010 | Lee et al. | 455/557 |

FOREIGN PATENT DOCUMENTS

| | | |
|---|---|---|
| JP | 2005277775 | 10/2005 |
| JP | 2006020273 | 1/2006 |
| JP | 2006121449 | 5/2006 |

OTHER PUBLICATIONS

International Search Report for PCT/JP2008/050381, mailed on Apr. 15, 2008, 3 pages.
Office Action for Japanese Patent Application No. 2007-298216, mailed Jul. 3, 2012 (two pages).
English translation of Office Action for Japanese Patent Application No. 2007-298216, mailed Jul. 3, 2012 (three pages).

* cited by examiner

*Primary Examiner* — Wesley Kim
(74) *Attorney, Agent, or Firm* — Duane Morris LLP; Richard C. Kim

(57) ABSTRACT

A mobile terminal device is provided which can be used without an incongruous feeling. In Step S14, it is determined whether or not the operated application is the second display state (landscape display). When it is determined that the application is not the landscape display, the process is transferred to Step S15, and the key operation functions assigned to the keys b1 to b6 of the "TURN-CLOSE STATE (LENGTHWISE)" of the key assignment table are assigned to the keys b1 to b6. In Step S14, when it is determined that the operated application is the landscape display, the process is transferred to Step S16, the key operation functions assigned to the keys b1 to b6 of "TURN-CLOSE STATE (WIDTHWISE)" of the key assignment table are assigned to the keys b1 to b6, and the key operation unit in the turn-close state has the same function as the cross key 15*a*.

5 Claims, 24 Drawing Sheets

(KEY ASSIGNMENT DETERMINATION FLOWCHART)

FIG. 11

KEY ASSIGNMENT TABLE

| USAGE FORMATION OF MOBILE TERMINAL DEVICE | IMAGE DISPLAY DIRECTION OR CONTENT OF DISPLAY UNIT | KEY a1 | KEY a2 | KEY a3 | KEY a4 | KEY a5 | KEY a6 | KEY b1 | KEY b2 | KEY b3 | KEY b4 | KEY b5 | KEY b6 |
|---|---|---|---|---|---|---|---|---|---|---|---|---|---|
| FOLDER OPEN STATE (STANDARD STATE) | LENGTHWISE (ONLY) | MOVE UP | MOVE LEFT | SELECT OR DETERMINE | MOVE RIGHT | MOVE DOWN | CANCEL OR RETURN | FUNCTION ASSIGNMENT OF KEY a6 | FUNCTION ASSIGNMENT OF KEY a2 | FUNCTION ASSIGNMENT OF KEY a4 | FUNCTION ASSIGNMENT OF KEY a3 | UNAVAILABLE | DETERMINED BY APPLICATION |
| TURN-CLOSE STATE | LENGTHWISE | | | | | | | FUNCTION ASSIGNMENT OF KEY a6 | FUNCTION ASSIGNMENT OF KEY a5 | FUNCTION ASSIGNMENT OF KEY a1 | FUNCTION ASSIGNMENT OF KEY a3 | FUNCTION ASSIGNMENT OF KEY a2 | FUNCTION ASSIGNMENT OF KEY a4 |
| | WIDTHWISE | | | | | | | FUNCTION ASSIGNMENT OF KEY a6 | FUNCTION ASSIGNMENT OF KEY a5 | FUNCTION ASSIGNMENT OF KEY a1 | FUNCTION ASSIGNMENT OF KEY a3 | DETERMINED BY APPLICATION | |
| FOLDER CLOSE STATE | INITIAL STANDBY SCREEN | | | | | | | DETERMINED BY APPLICATION | | | | | |

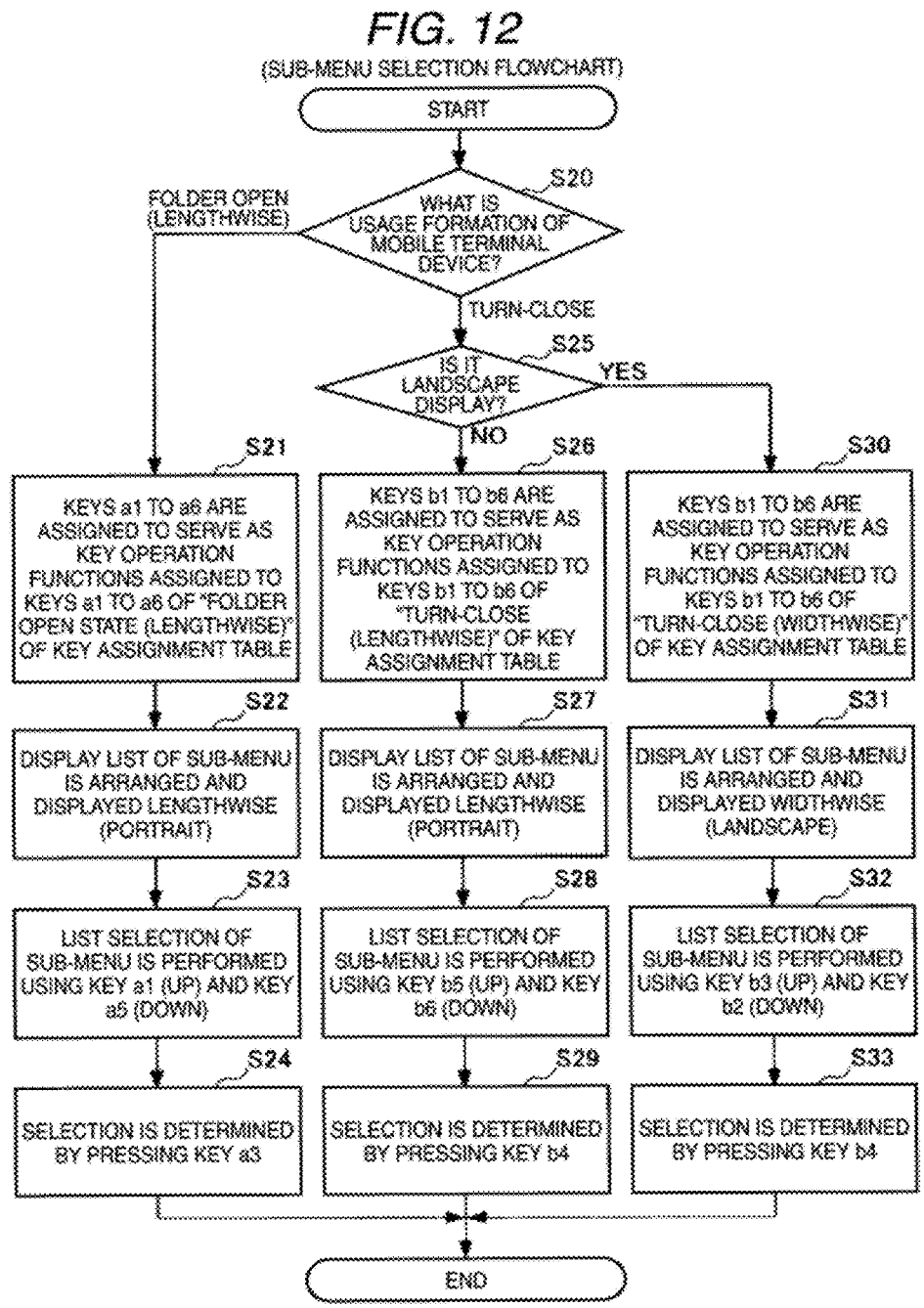

FIG. 13

KEY ASSIGNMENT TABLE

| USAGE FORMATION OF MOBILE TERMINAL DEVICE | IMAGE DISPLAY DIRECTION OR CONTENT OF DISPLAY UNIT | KEY a1 | KEY a2 | KEY a3 | KEY a4 | KEY a5 | KEY a6 | KEY b1 | KEY b2 | KEY b3 | KEY b4 | KEY b5 | KEY b6 |
|---|---|---|---|---|---|---|---|---|---|---|---|---|---|
| FOLDER OPEN STATE (STANDARD STATE) | LENGTHWISE (ONLY) | MOVE UP | MOVE LEFT | SELECT OR DETERMINE | MOVE RIGHT | MOVE DOWN | CANCEL OR RETURN | UNAVAILABLE | | | | DETERMINED BY APPLICATION | |
| | LENGTHWISE | | | | | | | FUNCTION ASSIGN-MENT OF KEY a6 | FUNCTION ASSIGN-MENT OF KEY a2 | FUNCTION ASSIGN-MENT OF KEY a4 | FUNCTION ASSIGN-MENT OF KEY a3 | FUNCTION ASSIGN-MENT OF KEY a1 | FUNCTION ASSIGN-MENT OF KEY a5 |
| TURN-CLOSE STATE | WIDTHWISE | | | | | | | FUNCTION ASSIGN-MENT OF KEY a6 | FUNCTION ASSIGN-MENT OF KEY a5 | FUNCTION ASSIGN-MENT OF KEY a1 | FUNCTION ASSIGN-MENT OF KEY a3 | FUNCTION ASSIGN-MENT OF KEY a2 | FUNCTION ASSIGN-MENT OF KEY a4 |

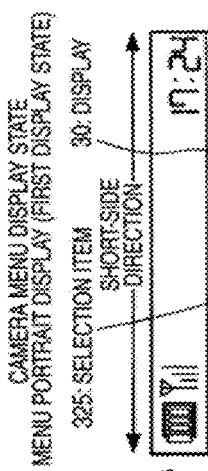
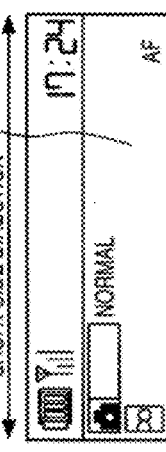
FIG. 14

FIG. 15
(A) CAMERA PREVIEW DISPLAY STATE
CAMERA LANDSCAPE DISPLAY (SECOND DISPLAY STATE)
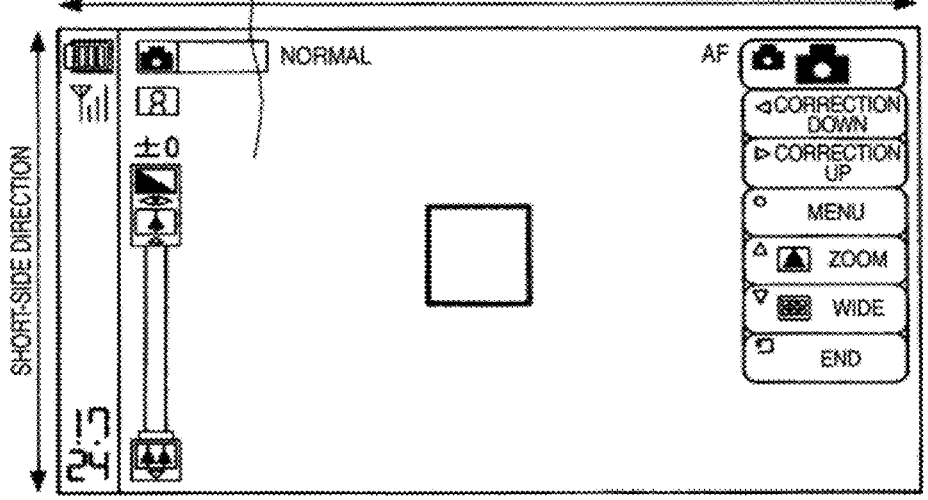
(B) CAMERA MENU DISPLAY STATE
MENU LANDSCAPE DISPLAY (SECOND DISPLAY STATE)
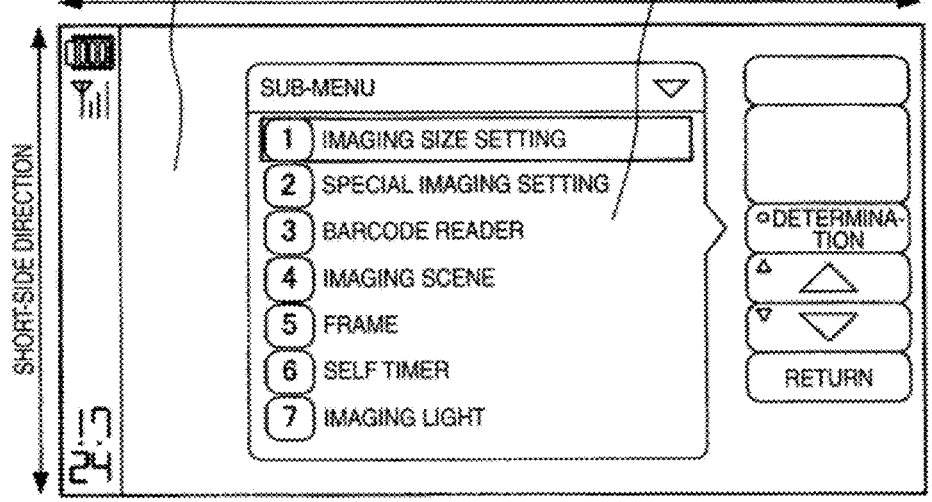

FIG. 21

| No. | APPLICATION TYPE | STATE OF CASE | | LONG/SHORT PRESS | A: BACKSIDE DETERMINATION KEY | B: BACKSIDE RIGHT KEY | C: BACKSIDE LEFT KEY | D: BACKSIDE CLEAR KEY | a: SIDE UP KEY | b: SIDE DOWN KEY |
|---|---|---|---|---|---|---|---|---|---|---|
| 0 | CAMERA APPLICATION | FIRST STATE | OPEN STATE | SHORT PRESS | — | — | — | — | UP (SIDE KEY) | DOWN (SIDE KEY) |
| | | | | LONG PRESS | — | — | — | — | UP (SIDE KEY) | DOWN (SIDE KEY) |
| | | SECOND STATE | CLOSE STATE | SHORT PRESS | — | — | — | — | — | — |
| | | | | LONG PRESS | — | — | — | — | — | — |
| | | THIRD STATE | TURN-CLOSE | SHORT PRESS | DETERMINATION | RIGHT | LEFT | CLEAR | UP | DOWN |
| | | | | LONG PRESS | DETERMINATION | RIGHT | LEFT | CLEAR | UP | DOWN |
| 1 | FM RADIO | FIRST STATE | OPEN STATE | SHORT PRESS | — | — | — | — | UP (SIDE KEY) | DOWN (SIDE KEY) |
| | | | | LONG PRESS | — | — | — | — | UP (SIDE KEY) | DOWN (SIDE KEY) |
| | | SECOND STATE | CLOSE STATE | SHORT PRESS | — | LEFT | RIGHT | SPECIAL 1 | UP (SIDE KEY) | DOWN (SIDE KEY) |
| | | | | LONG PRESS | — | LEFT | RIGHT | SPECIAL 2 | UP (SIDE KEY) | DOWN (SIDE KEY) |
| | | THIRD STATE | TURN-CLOSE | SHORT PRESS | DETERMINATION | RIGHT | LEFT | CLEAR | UP | DOWN |
| | | | | LONG PRESS | DETERMINATION | RIGHT | LEFT | SPECIAL 0 | UP | DOWN |
| 2 | TELEVISION, LENGTH-WISE | FIRST STATE | OPEN STATE | SHORT PRESS | — | — | — | — | UP (SIDE KEY) | DOWN (SIDE KEY) |
| | | | | LONG PRESS | — | — | — | — | UP (SIDE KEY) | DOWN (SIDE KEY) |
| | | SECOND STATE | CLOSE STATE | SHORT PRESS | — | RIGHT (SIDE KEY) | LEFT (SIDE KEY) | SPECIAL 3 | UP (SIDE KEY) | DOWN (SIDE KEY) |
| | | | | LONG PRESS | — | RIGHT (SIDE KEY) | LEFT (SIDE KEY) | SPECIAL 4 | UP (SIDE KEY) | DOWN (SIDE KEY) |
| | | THIRD STATE | TURN-CLOSE | SHORT PRESS | DETERMINATION | RIGHT | LEFT | CLEAR | UP | DOWN |
| | | | | LONG PRESS | DETERMINATION | RIGHT | LEFT | CLEAR | UP | DOWN |
| 3 | TELEVISION, WIDTH-WISE | FIRST STATE | OPEN STATE | SHORT PRESS | — | — | — | — | UP (SIDE KEY) | DOWN (SIDE KEY) |
| | | | | LONG PRESS | — | — | — | — | UP (SIDE KEY) | DOWN (SIDE KEY) |
| | | SECOND STATE | CLOSE STATE | SHORT PRESS | — | RIGHT (SIDE KEY) | LEFT (SIDE KEY) | SPECIAL 3 | UP (SIDE KEY) | DOWN (SIDE KEY) |
| | | | | LONG PRESS | — | RIGHT (SIDE KEY) | LEFT (SIDE KEY) | SPECIAL 4 | UP (SIDE KEY) | DOWN (SIDE KEY) |
| | | THIRD STATE | TURN-CLOSE | SHORT PRESS | DETERMINATION | RIGHT (SIDE KEY) | LEFT (SIDE KEY) | CLEAR (SIDE KEY) | UP (SIDE KEY) | DOWN (SIDE KEY) |
| | | | | LONG PRESS | DETERMINATION | RIGHT (SIDE KEY) | LEFT (SIDE KEY) | CLEAR (SIDE KEY) | UP (SIDE KEY) | DOWN (SIDE KEY) |

FIG. 22

| No. | APPLICATION TYPE | STATE OF CASE | | LONG/SHORT PRESS | A: BACKSIDE DETERMINATION KEY | B: BACKSIDE RIGHT KEY | C: BACKSIDE LEFT KEY |
|---|---|---|---|---|---|---|---|
| 0 | GENERAL APPLICATION | FIRST STATE | OPEN STATE | SHORT PRESS | — | — | — |
| | | | | LONG PRESS | — | — | — |
| | | SECOND STATE | CLOSE STATE | SHORT PRESS | — | — | — |
| | | | | LONG PRESS | — | — | — |
| | | THIRD STATE | TURN-CLOSE | SHORT PRESS | DETERMINATION | RIGHT | LEFT |
| | | | | LONG PRESS | CLEAR | RIGHT | LEFT |
| 1 | TELEVISION, WIDTHWISE | FIRST STATE | OPEN STATE | SHORT PRESS | — | — | — |
| | | | | LONG PRESS | — | — | — |
| | | SECOND STATE | CLOSE STATE | SHORT PRESS | DETERMINATION | RIGHT (SIDE KEY) | LEFT (SIDE KEY) |
| | | | | LONG PRESS | — | RIGHT (SIDE KEY) | LEFT (SIDE KEY) |
| | | THIRD STATE | TURN-CLOSE | SHORT PRESS | DETERMINATION | RIGHT | LEFT |
| | | | | LONG PRESS | CLEAR | RIGHT | LEFT |

MOBILE TERMINAL DEVICE

This application is a U.S. National Phase Application of International Application No. PCT/JP2008/050381 filed Jan. 15, 2008, which claims priority to Japanese Application Nos. 2007-006411 filed Jan. 15, 2007, 2007-006412 filed Jan. 15, 2007, 2007-007374 filed Jan. 16, 2007, and 2007-298216 filed Nov. 16, 2007, the disclosures of which are incorporated herein in their entirety.

TECHNICAL FIELD

The present invention relates to a mobile terminal device having a key assignment function.

BACKGROUND ART

A mobile terminal device is required to be smaller and lighter from the viewpoint of improving portability. However, when considering operability, there is a limit to the reduction in the size of operation keys. In addition, there is a demand for the screen size of a display screen to be large. For the coexistence of such contrary requests, in the latest mobile terminal devices, generally, a display case provided with a display screen is connected to an operation case provided with operation keys by a hinge, and a display panel including the display screen of the display case is opposed to an operation panel including the operation keys of the operation case, thereby being foldable (generally, referred to as a close state: a folder close state).

In addition, a mobile terminal device was proposed in which an operation case and a display case can be relatively turned about a second turning axis, using a 2-axis hinge having a first turning axis for folding and the second turning axis perpendicular to the first turning axis. In such a foldable mobile terminal device, it is possible to view a display screen with the whole mobile terminal device in a compact state, by folding the display panel outward and folding the operation panel inward (referred to as a turn-close state).

However, in the state of folding the display panel outward, that is, in the turn-close state, the operation panel is on the inside, and thus there is a problem that the operation keys cannot be operated. In the past, a mobile terminal device was proposed in which operation keys (cross key) are provided on a display panel, and thus it is possible to input a key operation even in the state (turn-close) of the display panel being folding outward (e.g., see Patent Document 1).

Patent Document 1: Japanese Patent Application Laid-Open No. 2006-020273

DISCLOSURE OF THE INVENTION

Problem that the Invention is to Solve

However, in the related art, a cross key configuration, which is able to cope only with lengthwise use of a display unit, is provided on a side of a main display screen or a side surface of a mobile terminal device. Accordingly, for example, when the display unit is used widthwise, it causes a sense of incongruity in operation. In addition, when the cross keys are used for uses other than the cross keys, there is an incongruous feeling in operation, and there are problems with the use of the mobile terminal device.

The invention has been made to solve the above-described problems, and an object of the invention is to provide a mobile terminal device in which the case is compact and the display screen is large.

Means for Solving the Problem

To solve the above problem, a mobile terminal device according to the present invention includes: a first case that comprises a first operation unit including up and down operation keys and left and right operation keys on a front portion thereof; a second case that comprises a display unit on a front portion thereof; a connection mechanism that connects the first case and the second case so as to be changed to a first state of exposing the front portion of the first case and the front portion of the second case, and a second state of covering the front portion of the first case with the second case and exposing the front portion of the second case; and a second operation unit that includes a pair of first operation keys disposed along a long-side direction of the display unit and a pair of second operation keys disposed along a short-side direction thereof, the second operation unit disposed at an exposed part of the first case or the second case in the second state, wherein an operation function of the up and down operation keys of the first operation unit is assigned to one of the first operation keys and the second operation keys, and an operation function of the left and right operation keys of the first operation unit is assigned to the other of the first operation keys and the second operation keys, in the second state.

Further, according to the above mobile terminal device, the pair of second operation keys disposed along the short-side direction of the second operation unit becomes unavailable for operation in the first state.

Further, according to the above mobile terminal device, the connection mechanism connects the first case and the second case so as to be changed to a third state of covering the front portion of the first case with the second case with the front portion of the first case opposed to the front portion of the second case, and an operation function different from the operation function of the up and down operation keys and the left and right operation keys is assigned to the first operation keys and the second operation keys of the second operation unit in the third state.

Further, according to the above mobile terminal device, a third operation key to which an operation function for any one of selection, determination, cancel, and return is assigned in a line on a straight line with respect to a part where the first operation keys or the second operation keys are disposed, in addition to the first operation keys or the second operation keys as the second operation unit.

Further, according to the above mobile terminal device, the connection mechanism is connected to the second case by a turning connection portion having a turning axis parallel to a display surface of the display unit of the second case, and the second operation keys are disposed on a surface of a part positioned on the same plane as the display unit exposed in the second state.

Further, according to the above mobile terminal device, the display unit is controlled for display to convert a display direction to any one of the long-side direction and the short-side direction of the second case, and the operation function of the up and down operation keys and the left and right operation keys assigned to the first operation keys and the second operation keys of the second operation unit is changed in response to the display direction of the display unit.

Further, a mobile terminal device according to the present invention comprises: a case; a display unit that is disposed in the case; a pair of first operation keys that is disposed along a long-side direction of the display unit; a pair of second operation keys that is disposed along a short-side direction of the display unit; an operation control unit that controls key assignment of the first operation keys and the second operation keys; and a display control unit that controls display of the display unit, wherein the display control unit controls conversion to a first display state where selection items in a predetermined type are arranged in the long-side direction or a second display state where selection items in the same type as the predetermined type are arranged in the short-side direction, and wherein the operation control unit performs key assignment to perform a selection operation of the selection items by the operation of the first operation keys in the first display state, and performs key assignment to perform the selection operation of the selection items by the operation of the second operation keys in the second display state.

Further, according to the above mobile terminal device, the case includes a first case in which a first operation unit is disposed at a front portion thereof; a second case in which the display unit is disposed at the front portion; and a connection mechanism that connects the first case and the second case to be changeable from a first state of developing both cases with the first operation unit and the display unit faced to the same direction, to a second state of covering the first operation unit with the second case with the display unit exposed, wherein the second operation keys are disposed along the short-side direction with respect to the display unit on a surface of the connection mechanism provided on the same plane as the display unit exposed in the second state.

Further, according to the above mobile terminal device, the first operation keys are disposed along a side surface corresponding to the long-side direction of the display unit as a side surface of the first case or the second case exposed in the second state.

Further, according to the above mobile terminal device, the display control unit controls a display direction so that the long-side direction becomes an up-down direction in the first display state and the short-side direction becomes the up-down direction in the second display state, and the operation control unit performs key assignment to perform the selection operation of the selection items in the same type as the predetermined type arranged and displayed in the long-side direction by the operation of the first operation keys in the second state and the first display state, and performs key assignment to perform the selection operation of the selection items in the same type as the predetermined type arranged and displayed in the short-side direction by the operation of the second operation keys in the second state and the second display state.

Further, according to the above mobile terminal device, the first operation unit comprises left and right operation keys corresponding to the short-side direction of the display unit in the first state and the first display state, and up and down operation keys corresponding to the long-side direction of the display unit in the first state and the first display state, and the operation control unit performs key assignment so that the operation function of the up and down operation keys and the operation function of the first operation keys become equal and the operation function of the left and right operation keys and the operation function of the second operation keys become equal in the second state and the first display state, and performs key assignment so that the operation function of the up and down operation keys and the operation function of the second operation keys become equal and the operation function of the left and right operation keys and the operation function of the first operation keys become equal in the second state and the second display state.

Further, a mobile terminal device according to the present invention comprises an operation unit that has a first key group including a plurality of keys, and a second key group consisting of at least one key not included in the first key group; a control unit that performs a process corresponding to a key when receiving a key operation during the executing of an application program operable by the operation unit; and a storage unit that stores the application program, the control unit is capable of executing all of a first application program operable only by the key included in the first key group and a second application program operable by any one of the first and second key groups, when the second application program is executed and any one key of the operation unit is operated, the control unit generates key signals corresponding to the operated keys and processes the key signals by the second application program, and wherein when the first application program is executed and any one key of the operation unit is operated, the control unit generates a key signal corresponding to the operated key and processes the key signal by the first application program when the operated key is the key included in the first key group, and the control unit generates a key signal corresponding to any one key of the first key group and processes the key signal by the first application program when the operated key is the key included in the second key group.

Further, according to the above terminal mobile device of the present invention, the storage unit stores and associates any one of first key signals corresponding to the keys included in the first key group with each of the keys included in the second key group, and when the first application program is executed and any one key of the second key group is operated, the control unit generates a key signal corresponding to the operated key with reference to the storage unit.

Further, the above terminal mobile device of the present invention further comprises a communication unit connectable to a public communication network, wherein the control unit acquires the first application program by the communication unit, and stores the first application program in the storage unit.

Further, according to the above mobile terminal of the present invention, when any one of the keys included in the second key group is pressed during the executing of the first application program, the control unit generates a first key signal after the lapse of a predetermined time from the time of occurrence of the key pressing without releasing the pressing, and when any one of the keys included in the second key group is pressed during the executing of the second application program, the control unit generates a second key signal after the lapse of a predetermined time from the time of occurrence of the key pressing without releasing the pressing.

Further, according to the above terminal mobile device of the present invention, when any one of the keys included in the second key group is pressed during the executing of the second application program, the control unit generates a second key signal at the time of releasing the pressing after occurrence of the key pressing, and when any one of the keys included in the second key group is pressed during the executing of the first application program, the control unit generates a first key signal after the lapse of a predetermined time from the time of occurrence of the key pressing without releasing the pressing.

Further, according to the above terminal mobile device of the present invention, when any one of the keys included in the second key group is operated during the executing of the first application program and the operated key is a predetermined key, the control unit generates a key signal after the lapse of a predetermined time from the time of releasing the key pressing or starting the key pressing, without generating the key signal at the time of starting the key pressing as an operation start.

Further, according to the above terminal mobile device of the present invention, the control unit controls the key signal generated when the pressing of the predetermined key is released within a predetermined time from the time of the pressing start of the key, and the key signal generated when the pressing of the predetermined key is released after the lapse of the predetermined time from the time of the pressing start, corresponding to the keys included in the first key group, to be different from each other.

Advantage of the Invention

According to the invention, in the second state, the operation functions are assigned to the second operation unit provided at the exposed part, according to the up and down operation keys and the left and right operation keys in the first operation unit in the first state. Therefore, the case is compact or the display screen is large, the operation having the same functions as those of the first state can be performed even in the second state. Accordingly, it is possible to perform the key operation without an incongruous feeling.

According to the invention, it is possible to realize a display of a predetermined type of selection items (sub-menu etc.) and the selection operation with an operation having no incongruous feeling, without increasing the size of the case (mobile terminal device) or increasing the production cost.

According to the invention, the key control, which makes the best use of the characteristics of the keys, is performed according to application programs, and differentiation from other companies is achieved due to the operability being improved.

BRIEF DESCRIPTION OF THE DRAWINGS

FIG. 11 is a diagram illustrating a key assignment table of the mobile terminal device according to the invention.

FIG. 12 is a flowchart of key assignment determination of the mobile terminal device according to the invention.

FIG. 13 is a diagram illustrating a key assignment table of the mobile terminal device according to the invention.

FIG. 14 is a diagram illustrating an example of a display state of a camera preview and a camera menu in a lengthwise display.

FIG. 15 is a diagram illustrating an example of a display state of a camera preview and a camera menu in a widthwise display.

FIG. 21 is a table illustrating an example of key assignment used for the mobile terminal device according to the embodiment of the invention.

FIG. 22 is a table illustrating an example of key assignment used for a mobile terminal device according to another embodiment of the invention.

DESCRIPTION OF REFERENCE NUMERALS AND SIGNS

1: MOBILE PHONE DEVICE (MOBILE TERMINAL DEVICE) (MOBILE PHONE), 2: OPERATION CASE (TRANSMISSION CASE), 2a, 3a: FRONT PANEL, 2b, 3b: REAR PANEL, 3: DISPLAY CASE (RECEPTION CASE), 4: CONNECTION PORTION (2-AXIS HINGE MECHANISM), 11: OPERATION KEY GROUP (FIRST OPERATION UNIT), 12: SOUND INPUT UNIT, 13: FUNCTION SETTING OPERATION KEY, 14: INPUT OPERATION KEY, 14a: CLEAR KEY, 15a: DETERMINATION KEY, 15b: CROSS KEY, 16: INTERFACE, 17: HEADPHONE/MICROPHONE TERMINAL, 18: INTERFACE, 19: CHARGE TERMINAL, 20: SIDE KEY, 21: OPERATION KEY, 22: ANTENNA, 23: CAMERA UNIT, 24: LIGHT UNIT, 25: BATTERY LID, 30: DISPLAY, 31: SOUND OUTPUT UNIT, 32: SUB-DISPLAY, 33: SECOND OPERATION KEY GROUP, 300: CONTROL UNIT, 301: ROM, 302: RAM, 303: WIRELESS COMMUNICATION UNIT, 304: USAGE FORMATION DETECTING UNIT, 305: DISPLAY DIRECTION DETECTING UNIT, 307: SUB-OPERATION UNIT, 308: DISPLAY CONTROL UNIT, 309: SOUND INPUT/OUTPUT UNIT, a1~a6, b1~b6: OPERATION KEY, 110: MOBILE PHONE, 111: COMMUNICATION UNIT, 112: CONTROL UNIT, 113: STORAGE UNIT, 114: SOUND PROCESSING UNIT, 115: DISPLAY UNIT, 116: OPERATION UNIT, 121: APPLICATION PROGRAM EXECUTION CONTROL UNIT (APPLICATION EXECUTION CONTROL UNIT, 122: KEY SIGNAL GENERATING UNIT, 123: CASE STATE DETECTING UNIT

BEST MODE FOR CARRYING OUT THE INVENTION

Hereinafter, the best mode for carrying out the invention will be described with reference to the drawings.

<Configuration of Mobile Terminal Device>

Figure 1:
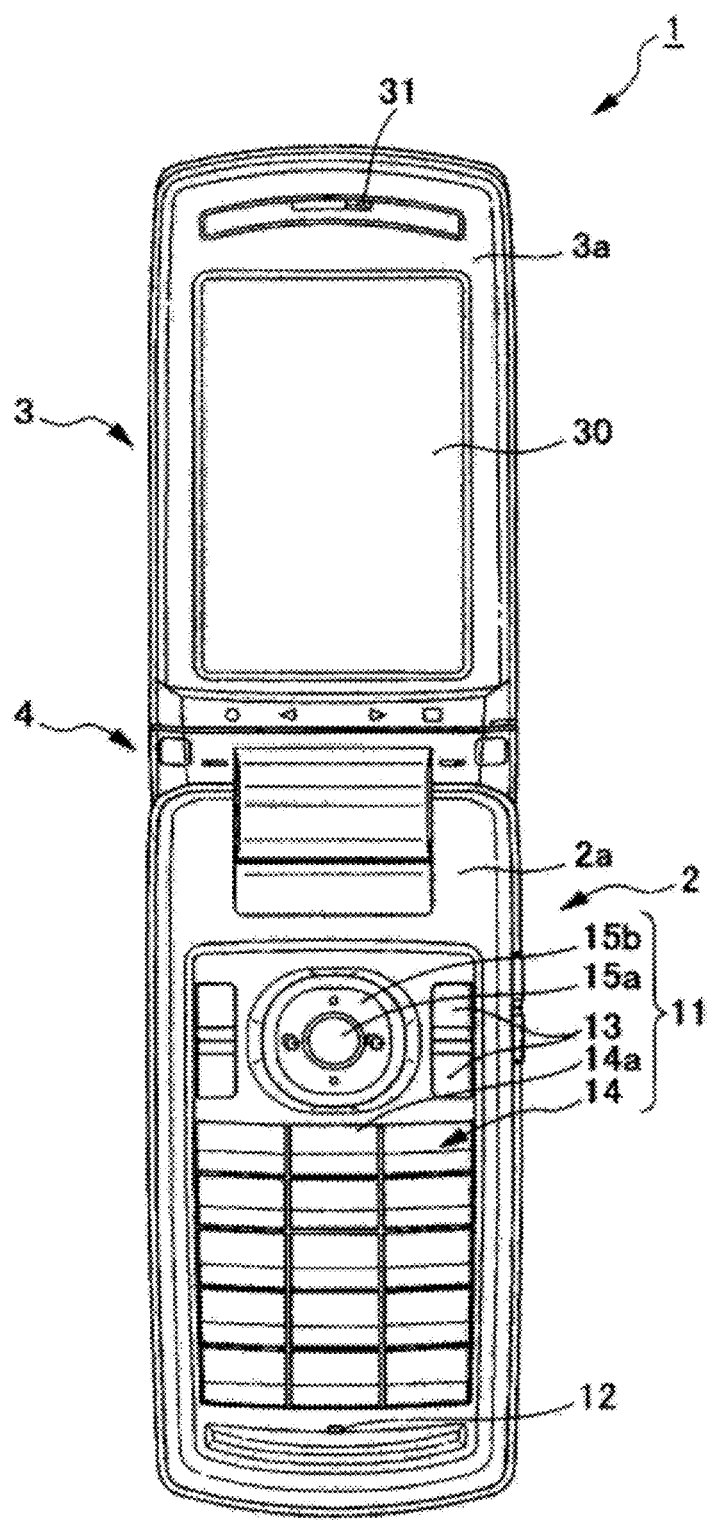
FIG. 1 is a front view of a mobile terminal device in an open state according to the invention.

FIG. 1 shows a front view of a mobile phone device 1 in an open state as an example of a mobile terminal device according to the invention. FIG. 2(A) shows a left side view of the mobile phone device 1 in the open state, and FIG. 2(B) shows a right side view of the mobile phone device 1 in the open state. FIG. 3 is a rear view of the mobile phone device 1 in the open state.

The mobile phone device 1 is provided with an operation case (first case) 2, a surface of which is formed of a front panel 2a and a rear panel 2b, and a display case (second case) 3, a surface of which is formed of a front panel 3a and a rear panel 3b. In the operation case 2, an operation key group (main operation unit as a first operation unit) 11 and a sound input unit 12, to which the voice from a user of the mobile phone device 1 is input at the time of phone communication, are exposed on a surface of the front panel 2a. The operation key group 11 includes a function setting operation key 13 for operating various settings and various functions such as a phone book function and a mail function, an input operation key 14 (14a: clear key) such as numeric keypad for inputting numerals for phone numbers and letters for texts, a determination key 15a for making decisions in various operations, and a cross key 15b (up and down operation key, left and right operation key) for scrolling up and down or left and right.

A predetermined function is assigned (key assignment) to each of the keys constituting the operation key group 11 according to the changeable state (open state, close state, turn-close state) of the operation case 2 and the display case 3 or the type of the operated application. When the key constituting the operation key group 11 is pressed by a user, an operation based on the assigned function is performed.

As shown in FIG. 2(A), one side surface of the operation case 2 is provided with an interface 16 for transmitting and receiving data to and from an external device (e.g., host device), a headphone/microphone terminal 17, an interface 18 for a detachable external memory, and a charge terminal 19. In addition, the interface 16, the headphone/microphone terminal 17, and the interface 18 are covered with detachable caps for protection against dust.

Figure 2:
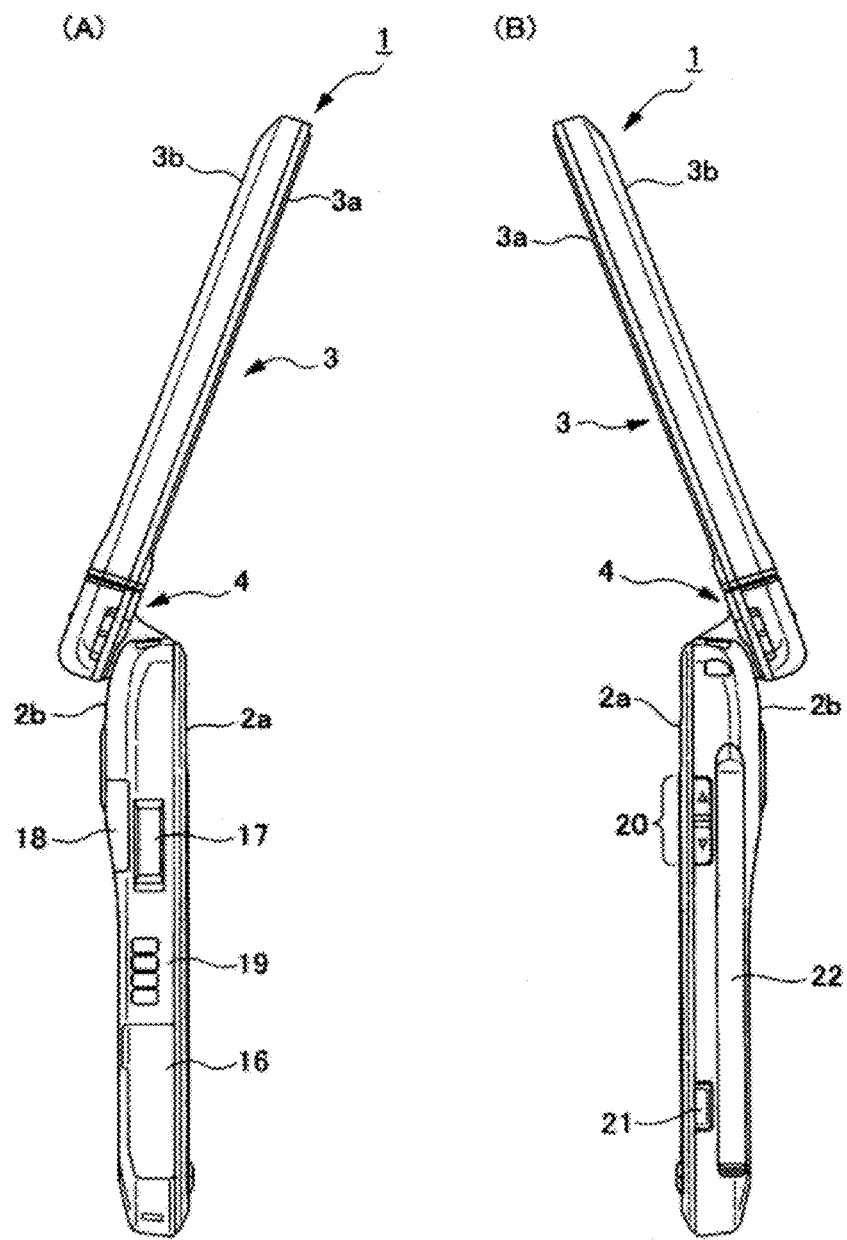
FIG. 2 is a side view of the mobile terminal device in the open state according to the invention.
Figure 3:
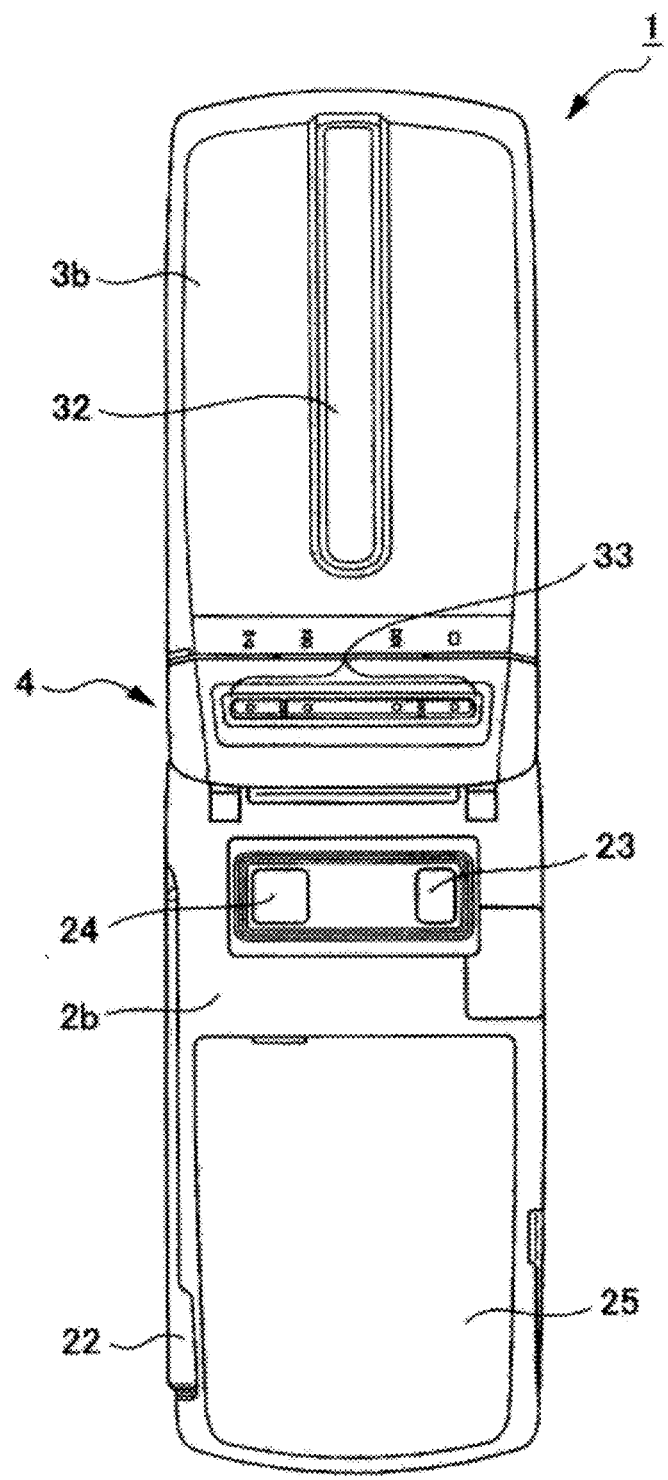
FIG. 3 is a rear view of the mobile terminal device in the open state according to the invention.

As shown in FIG. 2 (B), the other side surface of the operation case 2 is provided with a pair of side keys (first operation keys) 20, an imaging operation key 21, an antenna 22 for receiving broadcasting waves with the reception angle of which can be adjusted. A predetermined function is assigned (key assignment) to the side keys 20 according to the changeable state (open state, close state, turn-close state) of the operation case 2 and the display case 3 or the type of the operated application. When the side keys 20 are pressed by the user, the operation according to the assigned function is performed.

On the surface of the front panel 3a in the display case 3, a display 30 with a predetermined shape used for displaying various information, and a sound output unit 31 for outputting the voice of the other party of the phone communication are formed so as to be exposed.

As shown in FIG. 3, on the surface of the rear panel 2b in the operation case 2, a camera unit 23 for taking an image of a photography subject, and a light unit 24 for illuminating the photography subject with light are formed so as to be exposed. The rear panel 2b in the operation case 2 is provided with a battery lid 25 for covering a battery containing portion in which a battery is detachably housed.

On the surface of the rear panel 3b of the display case 3, a sub-display 32 with a predetermined shape used for displaying various information is formed so as to be exposed.

Both the display 30 and the sub-display 32 include a liquid crystal panel, a driving circuit for driving the liquid crystal panel, and a light source unit such as a back light for the illumination of light from the rear side of the liquid crystal panel.

As shown in FIG. 1 to FIG. 3, the upper end portion of the operation case 2 and the lower end portion of the display case 3 are connected to each other by a connection portion (connection mechanism) 4. As shown in FIG. 3, on one surface of the connection portion 4, a sub-operation key group 33 is provided arranged in a line. A predetermined function is assigned (key assignment) to each key of the sub-operation key group 33 according to the changeable state (open state, close state, turn-close state) of the operation case 2 and the display case 3 or the type of the operated application. When the key of the sub-operation key group 33 is pressed by the user, the operation according to the assigned function is performed.

Figure 4:
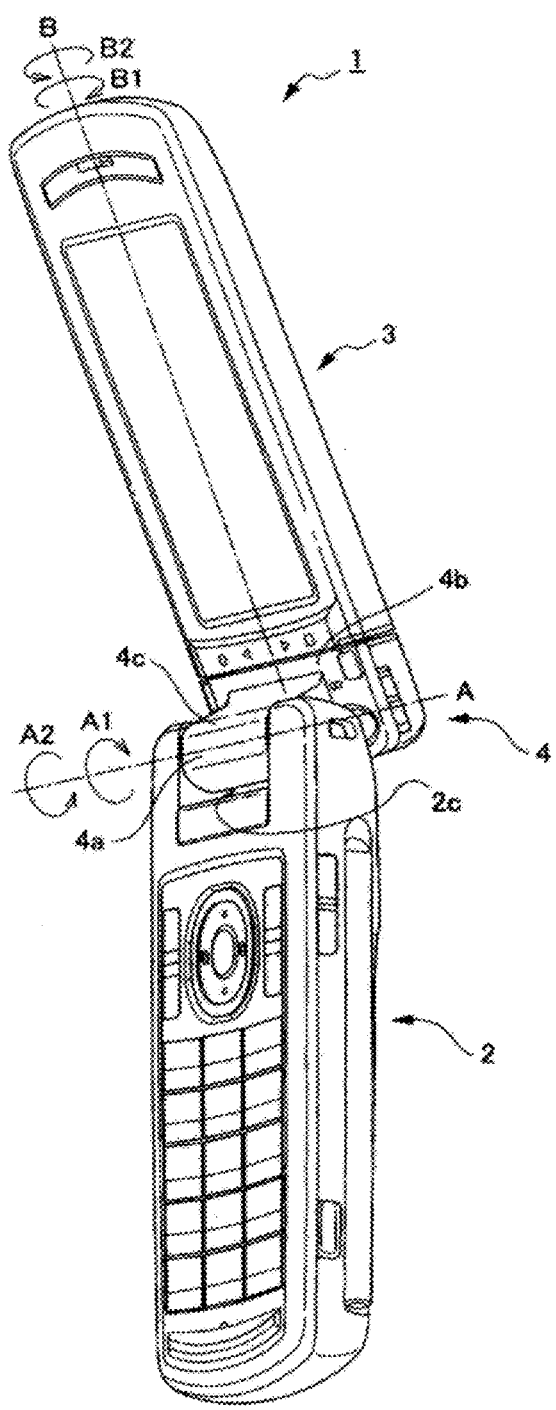
FIG. 4 is a perspective view of the mobile terminal device in the open state according to the invention, and is a perspective view of a breakdown of members built in an operation case.
Figure 5:
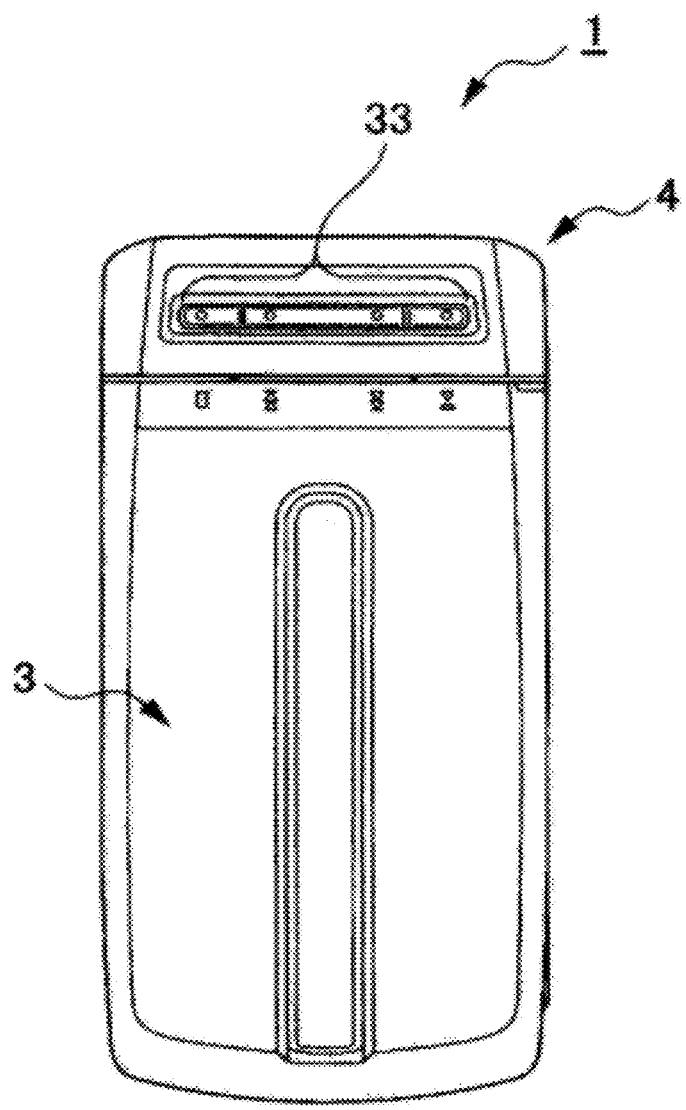
FIG. 5 is a plan view of a display case and the operation case of the mobile terminal device in a close state according to the invention.
Figure 6:
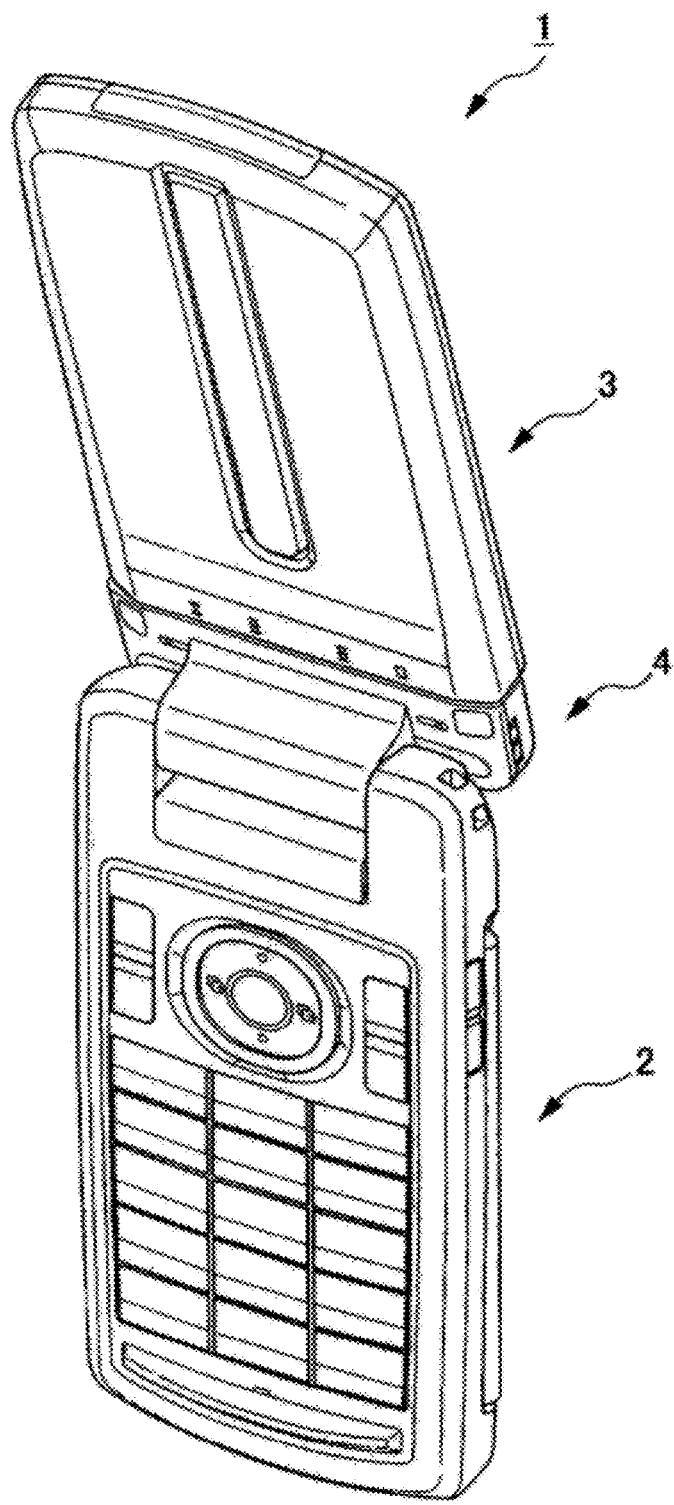
FIG. 6 is a perspective view of the display case of the mobile terminal device in a state (turn state) of turning about a turning axis of a connection portion by 180° according to the invention.
Figure 7:
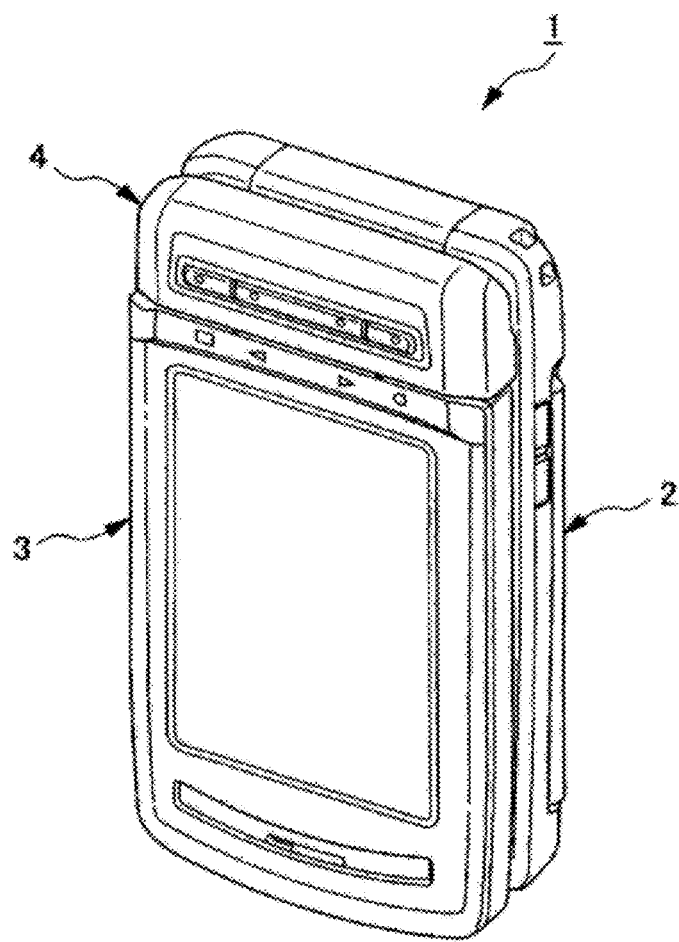
FIG. 7 is a perspective view of the display case shown in FIG. 6 in a close state (turn-close state) of turning and closing about an open-close axis of the connection portion.

Hereinafter, a structure and an operation of the connection portion 4 will be described with reference to FIG. 4 to FIG. 7. FIG. 4 shows a perspective view of the mobile phone device 1 in the open state. FIG. 5 shows a plan view of the mobile phone device 1 in a state (close state) of having closed the phone after turning the display case 2 and the operation case 3 of the mobile phone device 1 about an open/close axis A of the connection portion 4 in a direction indicated by an arrow A2, from the open state shown in FIG. 4. FIG. 6 show a perspective view of the mobile phone device 1 in a state (turn-open state) of having turned the display case 2 of the mobile phone device 1 about a turning axis B of the connection portion 4 in a direction indicated by an arrow B2 by 180°, from the open state shown in FIG. 4. FIG. 7 shows a perspective view of the mobile phone device 1 in a state (turn-close state) of having closed the phone after turning the display case 2 of the mobile phone device 1 about the open/close axis A of the connection portion 4 in the direction indicated by the arrow A2, from the turn-open state shown in FIG. 6.

The connection portion 4 is formed of a 2-axis hinge mechanism supporting the operation case 2 and the display case 3 so as it is able to be opened and closed at arbitrary angled about the open/close axis A and able to turn at arbitrary angles about the turning axis B.

One end 4a of the connection portion 4 is connected to the upper end portion of the operation case 2 by a connection member (not shown), and the other end 4b is connected to the lower end portion of the display case 3 by a connection member (not shown).

The one end 4a of the connection portion 4 is provided with a convex open/close portion 4c formed to vertically protrude from the surface of the connection portion 4. A concave notch portion 2c fitted to the convex open/close portion 4c is formed at the upper end portion of the operation case 2.

A hole portion A (not shown) is formed on both sides of the open/close portion 4c in the direction of the open/close axis A. A hole portion B (not shown) is formed on both insides of the notch portion 2c of the operation case 2. In the state where the convex open/close portion 4c is fitted to the concave notch portion 2c, the hole portion A and the hole portion B are opposed close to each other, and a cylindrical open/close connection member is inserted to the hole portion A and the hole portion B. Accordingly, the operation case 2 and the connection portion 4 are connected so they can open and close. The open/close portion 4c may have a shape of being fitted to the upper portion of the operation case 2, and is not particularly limited to the convex shape. In addition, the shape of the upper end portion of the operation case 2 is not limited to the concave shape.

The other end 4b of the connection portion 4 and the lower end portion of the display case 3 are axially attached so as to be able to turn to each other by a turning connection member. A hole portion C (not shown) is formed on the side surface of the connection portion 4 close to the display case 3. A hole portion D is formed on the side surface of the display case 3 close to the connection portion 4. The turning connection member is inserted to the hole portion C and the hole portion D, thereby connecting the operation case 2 and the connection portion 4 so as to be able to turn about the turning axis B.

As described above, in the mobile phone device 1, the operation case 2 and the display case 3 are connected to each other by the connection portion 4. Accordingly, the mobile phone device 1 can be changed into various states by relatively opening and closing about the open/close axis A or turning about the turning axis B. Therefore, the mobile phone device 1 can be in the open state and the close state, and the operation case 2 can be switched between the turn-open state and the turn-close state in each of the open state and the close state.

In this case, the close state means a state where both cases are disposed so as to overlap with each other, and the open state means a state where both cases are disposed so as not to overlap with each other. The turn-open state means a state where the surface of the display case 3, on which the display 30 is disposed, and the surface of the operation case 2, on which the operation key group 11 is disposed, are disposed to face the same side. The turn-close state means a state where the surface of the operation case 2 and the surface of the display case 3 are disposed to face the different sides from each other.

For example, when a relative open operation is performed in a direction indicated by an arrow A1 about the open/close axis A, the operation case 2 and the display case 3 can be in an open state (normal open state (first state)).

When a relative close operation is performed in the direction indicated by the arrow A2 about the open/close axis A, the operation case 2 and the display case 3 can be in a folded state (normal close state) (see FIG. 5).

In the normal open state, when the display case 3 is in the state (turn-open state, see FIG. 6) of having been turned in the direction indicated by the arrow B2 by 180° about the turning axis B, or the display case 3 is in the close state of having been closed in the direction indicated by the arrow A2 about the open/close axis A from the turn-open state, the display case 3 can be in the folded state (turn-fold (turn-close) state) with the front panel 3a of the display case 3 exposed outward (see FIG. 7).

In the embodiment, the foldable mobile phone device 1 using the connection portion 4 is described, but the mobile phone device 1 may be a slide type where one case can be slid in one direction from a state where both cases 2 and 3 overlapped with each other, or a turning type (revolver type) where one case can be turned about an axial line along an overlapping direction, but not the foldable type.

The operation case 2 is provided with the front case 2a, a key sheet including the above-described operation key group 11, a flexible printed wiring board for key switch, a shield case, a circuit board including various electronic components such as a reference potential pattern layer and an RF (Radio Frequency) module for a mobile phone, an antenna unit, a rear case, a battery, and a battery lid. The battery is housed so as to be attachable to and detachable from the outside of the rear case 2b.

The front case 2a and the rear case 2b are disposed to face the concave inner surfaces thereof of each other, and are coupled to overlap outer peripheries thereof with each other. The key sheets, the flexible printed wiring board, the shield case, the circuit board, and the antenna unit are provided in this order between the front case 2a and the rear case 2b. That is, the shield case is stacked to cover the flexible printed wiring board, and the key sheet is stacked on the upper surface of the flexible printed wiring board.

The front case 2a is provided with a plurality of key holes in the inner surface opposed to the display 30 of the display case 3 when the mobile phone device 1 is folded. The pressing surfaces of the function setting operation key 13, the input operation key 14, and the cross key 15b are exposed from the plurality of key holes. When the pressing surfaces of the function setting operation key 13, the input operation key 14, and the cross key 15b constituting the exposed operation key group 11 are pressed, the top point of a metal dome (bowl shape) in each of the corresponding key switches is pressed, thereby electrically connected to a switch terminal.

<Description of Main Parts of the Invention>

Next, the main point of the invention will be described in detail.

Figure 8:
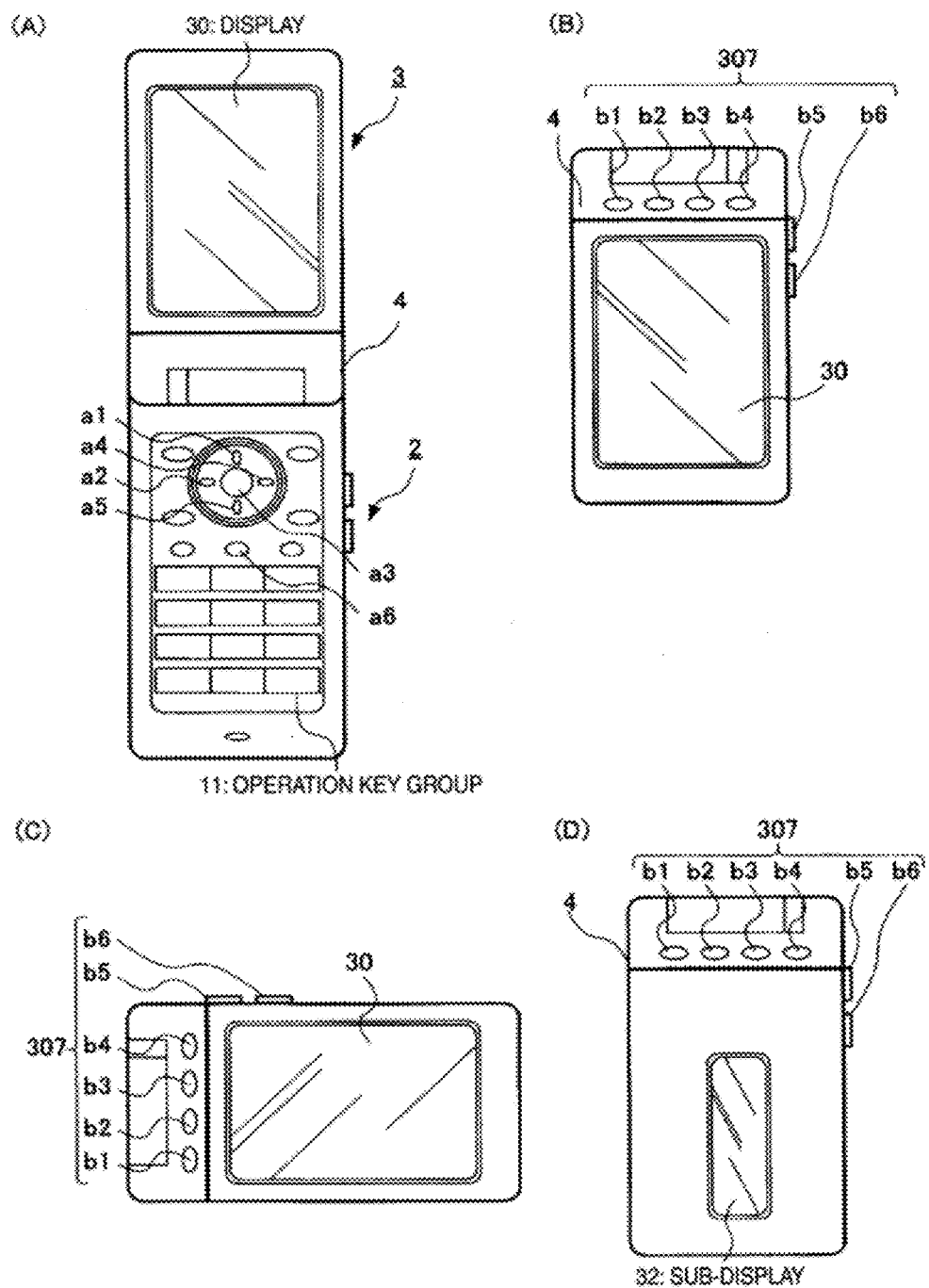
FIG. 8 is a view illustrating usage formations of the mobile terminal device according to the invention.

FIG. 8 is a diagram illustrating usage formations of the mobile terminal device according to the invention. As shown in FIG. 8, the usage formations of the mobile terminal device according to the invention can be classified to, for example, four kinds of usage formations according to the kinds of the applications operated in the mobile terminal device. The optimal assignment of the operation keys (key assignment) is performed according to the usage formations. Hereinafter, these four kinds of usage formations will be described.

FIG. 8(A) shows a folder open state (lengthwise use) generally called an open state (first state), which is the optimal usage formation in case of using a phone function or a mail function. The key operation in this type is performed by the operation key group (main operation unit) 11 including the determination key 15a (operation key a3), the cross key 15b (operation keys a1, a2, a4, and a5), and the clear key 14a (operation key a6) provided in the operation case (first case) 2. The result of the key operation is reflected to the display (display unit) 30 provided in the display case (second case) 3.

FIG. 8(B) shows the turn close state (lengthwise use) as the second state, which is, for example, the usage formation in case of using a photography function or a game function. The key operation in this type is performed by the sub-operation unit 307 as the second operation unit including the sub-operation key group (left and right operation keys) and the side keys (up and down operation keys). The result of the key operation is reflected on the display unit 30.

FIG. 8(C) shows the turn-close state (widthwise use) as the second state, which is, for example, the optimal usage formation in case of using a photography function or a television function. The key operation in this type is performed by the sub-operation unit 307 including the sub-operation key group (up and down operation keys) and the side keys (left and right operation keys). The result of the key operation is reflected on the display unit 30.

FIG. 8(D) shows the folder close state called the close state (third state) generally, which is the optimal use state in case of not using the display unit 30, or, for example, a music player function or the like. The key operation in this type is performed by the sub-operation unit 307. The result of the key operation is reflected on the sub-display (sub-display unit) 32.

Figure 9:
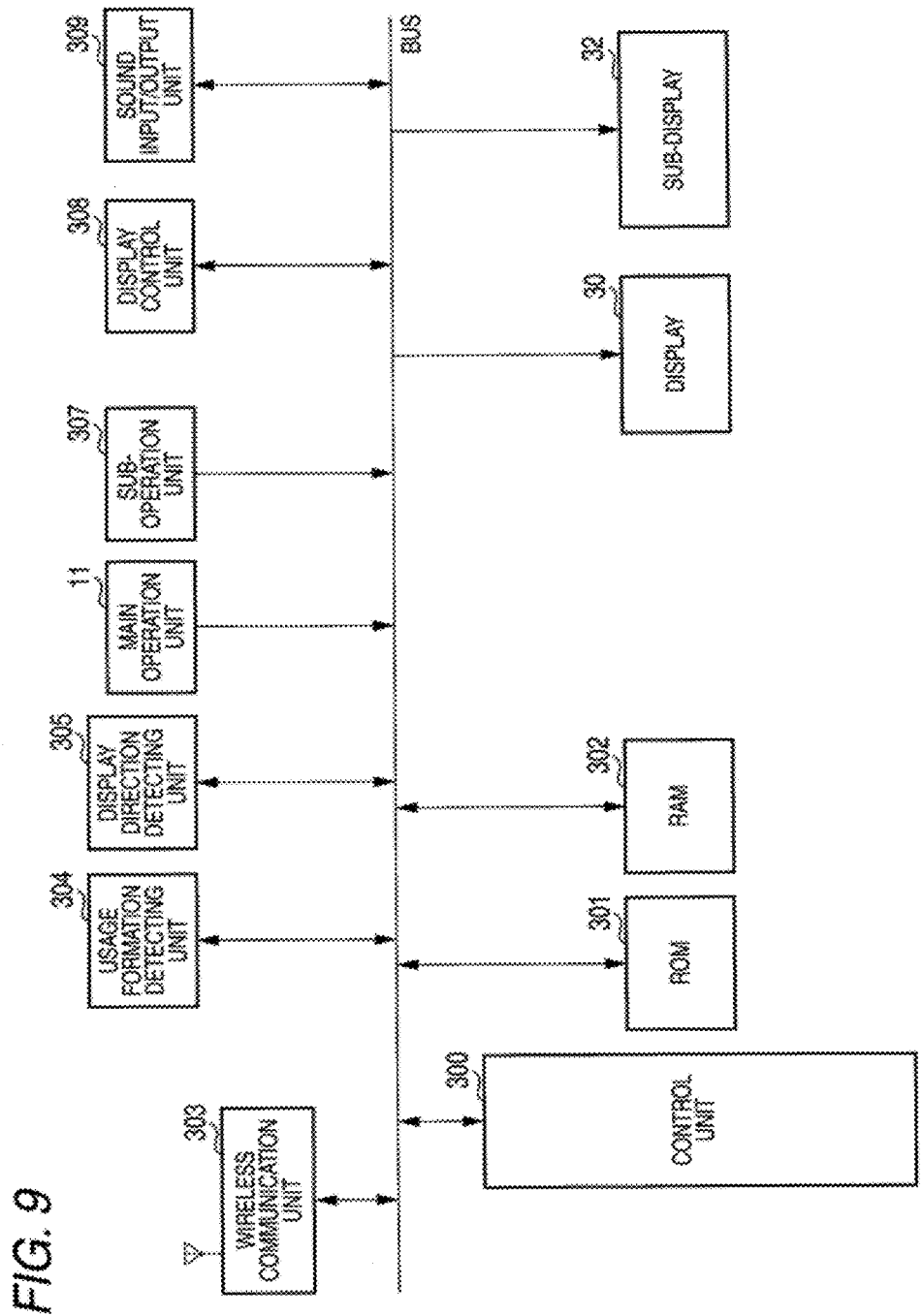
FIG. 9 is a functional block diagram of the mobile terminal device according to the invention.

FIG. 9 shows a functional block diagram of the mobile terminal device used to perform the key assignment operation necessary for performing the optimal assignment (key assignment) of the operation keys, so as to perform an intuitive key operation according to each usage formation of the mobile terminal device 1.

As shown in FIG. 9, the functional block diagram necessary for the key assignment or the like of the mobile terminal device 1 includes a control unit 300, a ROM 301, a RAM 302, a display (display unit) 30, a sub-display 32, a wireless communication unit 303, a usage formation detecting unit 304, a display direction detecting unit 305, a main operation unit 11 (operation key group), a sub-operation unit 307, a display control unit 308, and a sound input/output unit 309.

The control unit 300 controls the overall mobile terminal device 1 with the ROM 301 and the RAM 302. A control program, various application programs, a key assignment table, and the like are stored in advance in the ROM 301. The control unit 300 controls each functional block on the basis of the control program stored in the ROM 301, and performs the starting, stopping, controlling and the like of the various application programs stored in the ROM 301.

The wireless communication unit 303 and the sound input/output unit 309 are functional blocks for realizing a function as a mobile phone device. The display 30 and the sub-display 32 perform various displays by the various applications.

The usage formation detecting unit 304 detects that the mobile terminal device 1 is in any formation of the above-described four formations (e.g., it is detected that the mobile terminal device 1 is in any formation (state) of the three states (open, close, turn-close) by a magnetic sensor or the like provided at each unit of the mobile terminal device 1, and that the mobile terminal device is in any formation of the lengthwise and widthwise usage formations in the turn-close state according to the kind of the application). When the formation is changed, the detection result is transmitted to the control unit 300. Accordingly, the control unit 300 stores the detection result in the RAM 302 as "PRESENT USAGE FORMATION OF MOBILE TERMINAL DEVICE".

The display direction detecting unit 305 detects whether the display 30 is used lengthwise (type where the long-side direction is the up-down direction of display) or widthwise (type where the short-side direction is the up-down direction of display) from the presently operated application program, and transmits the detection result to the control unit 300. The detection whether the display 30 is used lengthwise (long-side direction) or widthwise (short-side direction) is performed by using information on the presently operated application program included in the control signal transmitted from the control unit 300 to the display direction detecting unit 305. Accordingly, the control unit 300 stores the detection result in the RAM 302 as "PRESENT DISPLAY DIRECTION OF MOBILE TERMINAL DEVICE".

When the operation key is pressed, the main operation unit 11 and the sub-operation unit 307 transmit the information thereof to the control unit 300.

The display control unit 308 is formed of, for example, a one-chip computer, and displays images displayed on the display 30 lengthwise or widthwise on the basis of the display direction determined for each application program.

The sound input/output unit 309 outputs sound necessary for each operated application program.

Figure 10:
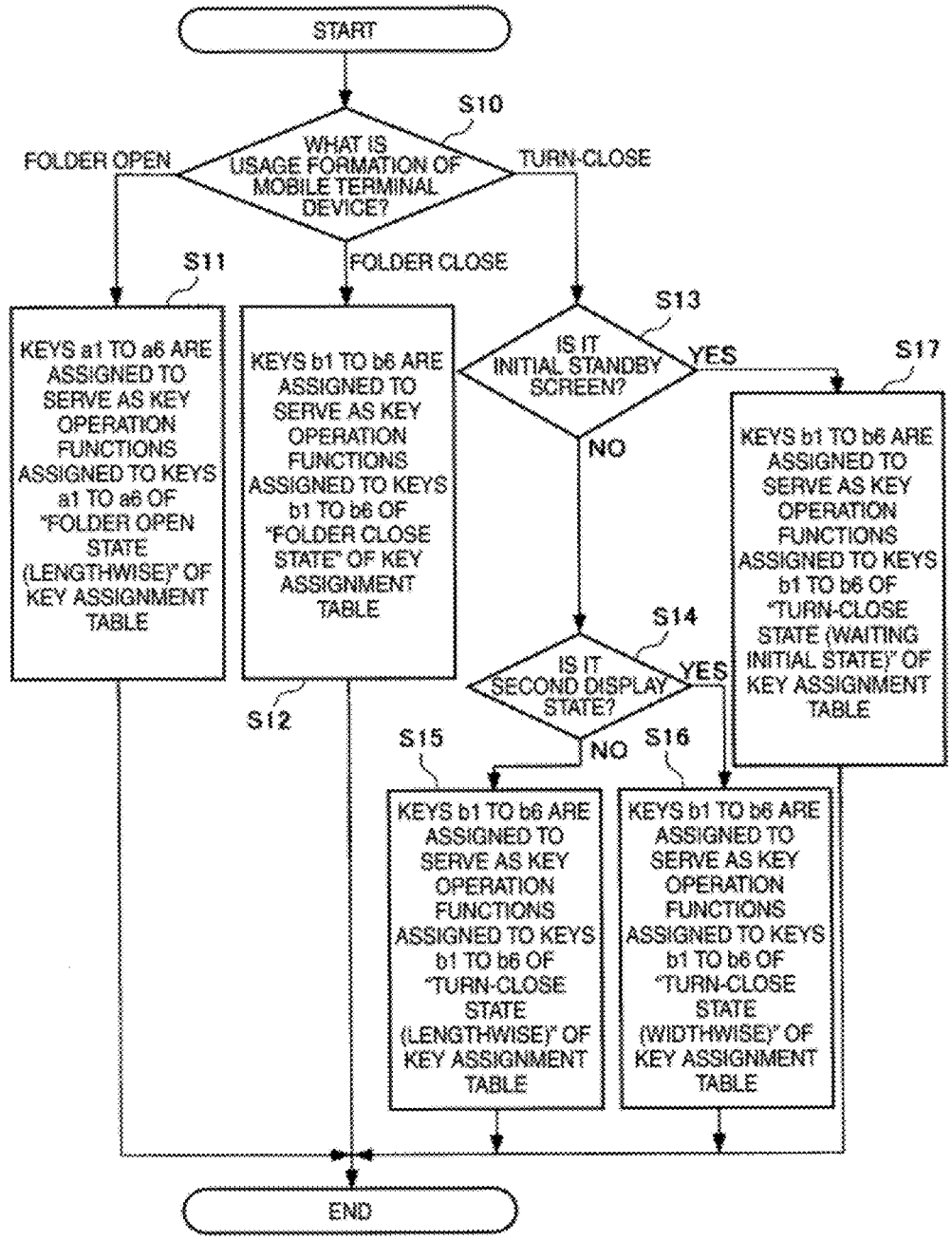
FIG. 10 is a flowchart of key assignment determination of the mobile terminal device according to the invention.

Next, a sequence (method) for performing the optimal assignment (key assignment) of the operation keys so that the intuitive key operation can be set for the user according to the above-described usage formations (four formations) of the mobile terminal device 1 will be described with reference to FIG. 10 and FIG. 11. FIG. 10 is a flowchart for the key assignment, and FIG. 11 shows a specific key assignment table.

First, the control unit 300 detects the present usage formation of the mobile terminal device in Step S10. Specifically, the control unit 300 determines the present usage formation of the mobile terminal device with reference to "PRESENT USAGE FORMATION OF MOBILE TERMINAL DEVICE" of RAM 302. In Step S10, when the control unit determines that the mobile terminal device is in the folder open state, the control unit 300 transfers the process to Step S11.

In Step S11, the control unit 300 assigns to the operation keys a1 to a6 the key operation functions assigned to the operation keys a1 to a6 in "FOLDER OPEN STATE (LENGTHWISE)" of the key assignment table stored in the ROM 301. This key assignment is the state (normal key assignment) as a standard of the mobile terminal device 1, and this key assignment is intrinsic to the mobile terminal device 1. The key operation functions of the operation keys a1 to a6 are assigned to the operation keys b1 to b6 later.

In Step S10, when the control unit 300 determines that the mobile terminal device is in the folder close state, the control unit 300 transfers the process to Step S12.

In Step S12, the control unit 300 assigns to the operation keys b1 to b6 the key operation functions assigned to the operation keys b1 to b6 in "FOLDER CLOSE STATE" of the key assignment table stored in the ROM 301. In this case, the assignment of the operation keys b1 to b6 is determined by the application operated from this time or the operated application. For example, when the operation key b1 is pressed, the music player starts. Hereinafter, the operation keys b5 and b6 may be referred to as the first operation keys, the operation keys b2 and b3 may be referred to as the second operation keys, and the operation key b4 may be referred to as the third operation key, and the operation key b1 may be referred to as the fourth operation key.

Meanwhile, in Step S10, when it is determined that the mobile terminal device is in the turn-close state, the control unit 300 transfers the process to Step S13.

In Step S13, the control unit 300 determines whether or not the image displayed on the display (display unit) 30 is an initial standby screen. In this case, the initial standby screen is displayed when the application to be operated is not selected before the mobile terminal device 1 is in the turn-close state. In Step S13, when the display of the display unit 30 is the initial standby screen, the control unit 300 transfers the process to Step S17.

In Step S17, the control unit 300 assigns to the operation keys b1 to b6 the key operation functions assigned to the operation keys b1 to b6 of "TURN-CLOSE STATE (INITIAL STANDBY SCREEN)" of the key assignment table stored in the ROM 301. In this case, the assignment of the operation keys b1 to b6 is determined by the application operated from this time or the operated application. For example, when the operation key b2 is pressed, the camera starts.

Meanwhile, in Step S13, when the initial standby screen is not displayed, that is, when the application to be operated has been already selected before the mobile terminal device is in the turn-close state, or when a specific application is operated from the turn-close state, the process is transferred to Step S14.

In Step S14, the control unit 300 determines whether or not the operated application is the landscape display (second display state), that is, the up-down direction of the display 30 in the short-side direction (up-down direction in FIG. 8(C)) is the up-down direction of the image display. When the control unit 300 determines that it is not the landscape display but the portrait display (first display state), that is, when the up-down direction of the display 30 in the long-side direction (up-down direction in FIG. 8(B)) is the up-down direction of the image display, the process is transferred to Step S15.

In Step S15, the control unit 300 assigns to the operation keys b1 to b6 the key operation functions assigned to the operation keys b1 to b6 in "TURN-CLOSE STATE (LENGTHWISE)" of the key assignment table stored in the ROM 301. Specifically, the function (cancel (clear) or return) of the operation key a6 as the operation function of the operation key b1 is assigned, the function (move left) of the operation key a2 as the operation function of the operation key b2 is assigned, the function (move right) of the operation key a4 as the operation function of the operation key b3 is assigned, the function (selection or determination) of the operation key a3 as the operation function of the operation key b4 is assigned, the function (move up) of the operation key a1 as the operation function of the operation key b5 is assigned, and the function (move down) of the operation key a5 as the operation function of the operation key b6 is assigned.

Meanwhile, in Step S14, when the control unit 300 determines that the operated application is the second display state (landscape display), the process is transferred to Step S16.

In Step S16, the control unit 300 assigns to the operation keys b1 to b1the key operation functions assigned to the operation keys b1 to b6 in "TURN-CLOSE STATE (LENGTHWISE)" of the key assignment table stored in the ROM 301. Specifically, the function (cancel (clear) or return) of the operation key a6 as the operation function of the operation key b1 is assigned, the function (move down) of the operation key a5 as the operation function of the operation key b2 is assigned, the function (move up) of the operation key a1 as the operation function of the operation key b3 is assigned, the function (selection or determination) of the operation key a3 as the operation function of the operation key b4 is assigned, the function (move left) of the operation key a2 as the operation function of the operation key b5 is assigned, and the function (move right) of the operation key a4 as the operation function of the operation key b6 is assigned.

According to the mobile terminal device 1 configured as described above, there are the following advantages.

The sub-operation unit 307 in the folder close state or the turn-close state can have the operability of the cross key 15b, the determination key 15a, and the clear key 14a in the folder open state, and thus it is possible to use the sub-operation unit 307 without the same incongruous feeling as the cross key 15b, the determination key 15a, and the clear key 14a.

In addition, it is possible to reduce the space occupied by the sub-operation unit 307 as compared with the case where the exposed part is provided with the cross key, in the folder close state or the turn-close state, like the known example. Accordingly, the size of the case can be reduced, or the size of the screen (display unit) can be made larger.

In addition, even when the keys of the sub-operation unit 307 are used for uses other than the use of the cross key 15b, the determination key 15a, and the clear key 14a, the key operation can be performed without the incongruous feeling.

In addition, it is possible to realize the key assignment which is easily visible according to the layout (lengthwise/widthwise) of the mobile terminal device.

Next, a sequence (method) for realizing the optimal assignment (key assignment) of the operation keys and the optimal list display or scroll of the sub-menu so that the intuitive key operation can be performed for the user according to the above-described usage formations (three formations in FIG. 8(A) to FIG. 8(C)) of the mobile terminal device 1 will be described with reference to FIG. 12 to FIG. 15. FIG. 12 is a flowchart illustrating a sequence for performing the key assignment and the list display and selection of the sub-menu, FIG. 13 shows a specific key assignment table, FIG. 14 shows an example of a camera preview and a display state of a camera menu in the lengthwise display, and FIG. 15 shows an example of a camera preview and a display state of a camera menu in the widthwise display.

The usage formation detecting unit 304 detects that the mobile terminal device 1 is in any formation of the above-described three formations (e.g., it is detected that the mobile terminal device 1 is in any formation (state) of the two states (open, close) by a magnetic sensor or the like provided at each unit of the mobile terminal device 1, and that the mobile terminal device is in any formation of the lengthwise and widthwise display in the turn-close state according to the kind of the application). When the type is changed, the detection result is transmitted to the control unit 300. Accordingly, the control unit 300 stores the detection result In the RAM 302 as "PRESENT USAGE FORMATION OF MOBILE TERMINAL DEVICE". The detection of the above-described states (widthwise and lengthwise display states of turn-close) from the application program is performed, for example, on the basis of the application program operation state included in the control data information transmitted from the control unit 300 to the usage formation detecting unit 304. Thereafter, the same manner is applied.

The display direction detecting unit 305 detects whether the display 30 will perform the lengthwise display (first display state of arranging and displaying the sub-menu as the selection items in the long-side direction) or the widthwise display (second display state of arranging and displaying the sub-menu as the selection items in the short-side direction) from the presently operated application program, and transmits the detection result to the control unit 300. Accordingly, the control unit 300 stores the detection result in the RAM 302 as "PRESENT DISPLAY DIRECTION OF MOBILE TERMINAL DEVICE".

When the operation keys are pressed, the main operation unit 11 and the sub-operation unit 307 send the information thereof to the control unit 300.

The display control unit 308 is formed of, for example, a one-chip computer, and displays images (list of the sub-menu, etc.) displayed on the display 30 lengthwise or widthwise on the basis of the display direction determined for each application program, that is, "PRESENT DISPLAY DIRECTION OF MOBILE TERMINAL DEVICE" read from the RAM 302 and transmitted as a part of the control data by the control unit 300.

First, in Step S20, the control unit 300 detects the present usage formation of the mobile terminal device. Specifically, the control unit 300 determines the present usage formation of the mobile terminal device with reference to "PRESENT USAGE FORMATION OF MOBILE TERMINAL DEVICE" of the RAM 302. In Step S20, when the control unit 300 determines that the mobile terminal device is in the folder open state, the control unit 300 transfers the process to Step S21.

In Step S21, the control unit 300 assigns to the operation keys a1 to a6 the key operation functions assigned to the operation keys a1 to a6 of "FOLDER OPEN STATE (LENGTHWISE)" of the key assignment table stored in the ROM 301, and transfers the process to Step S22. This key assignment is the state (normal key assignment) as a standard of the mobile terminal device 1, and this key assignment is intrinsic to the mobile terminal device 1. The key operation functions of the operation keys a1 to a6 are assigned to the operation keys b1 to b6 later.

In Step 22, when the display of the sub-menu is performed, the control unit 300 (display control unit 308) arranges and displays the display list of the sub-menu lengthwise (long-side direction) of the display 30, and transfers the process to Step S23.

In Step S23, a desired list is selected from the display list of the sub-menu displayed on the display 30 using the operation key a1 (up) and the operation key a5 (down), and the process is transferred to Step S24.

In Step S24, the selection is determined by pressing the determination key a3.

Meanwhile, in Step S20, when the control unit 300 determines that the present usage formation of the mobile terminal device is the turn-close state, the control unit 300 transfers the process to Step S25.

In Step S25, the control unit 300 detects the present image display direction (landscape display or portrait display) of the application program on the display 30. Specifically, the control unit 300 determines the present display direction of the mobile terminal device with reference to "PRESENT DISPLAY DIRECTION OF MOBILE TERMINAL DEVICE" in RAM 302. In Step S25, when the control unit 300 determines that the display direction is the portrait display, the control unit 300 transfers the process to Step S26.

In Step S26, the control unit 300 assigns to the operation keys b1 to b6 the key operation functions assigned to the operation keys b1 to b6 of "TURN-CLOSE STATE (LENGTHWISE)" of the key assignment table stored in the ROM 301. Specifically, the function (cancel (clear) or return) of the operation key a6 as the operation function of the operation key b1 is assigned, the function (move left) of the operation key a2 as the operation function of the operation key b2 is assigned, the function (move right) of the operation key a4 as the operation function of the operation key b3 is assigned, the function (selection or determination) of the operation key a3 as the operation function of the operation key b4 is assigned, the function (move up) of the operation key a1 as the operation function of the operation key b5 is assigned, and the function (move down) of the operation key a5 as the operation function of the operation key b6 is assigned.

However, when it is assumed that the camera (portrait display) is selected as the application program of the mobile terminal device, an image of the camera preview display state is displayed on the display 30 as shown in FIG. 14(A). In this case, the key assignment is completed, and thus, for example, the operation key b5 (up) and the operation key b6 (down) serve as zoom adjusting keys of the camera, and the operation key b2 (left) and the operation key b3 (right) serve as brightness adjusting keys of the camera. Then, when the operation key (e.g., operation key b1 or operation key b4) corresponding to a "MENU" icon at the lower part of FIG. 14(A) is pressed, the control unit 300 transfers the process to Step S27.

In Step S27, when a display instruction of the sub-menu is performed, the control unit 300 arranges and displays the display list (selection item 325) of the sub-menu in the lengthwise (long-side) direction of the display 30 (see FIG. 14(B)) and transfers the process to Step S28.

In Step S28, a cursor (highlight bar, etc.) is moved in the display list of the sub-menu displayed on the display 30 using the operation key b5 (up) and the operation key b6 (down) to select a desired list, and the process is transferred to Step S29.

In Step S29, the selection is determined by pressing the determination key b4.

Meanwhile, in Step S25, when the control unit 300 determines that the present display direction of the application program is the landscape display, the control unit 300 transfers the process to Step S30.

In Step S30, the control unit 300 assigns to the operation keys b1 to b6 the key operation functions assigned to the operation keys b1 to b6 of "TURN-CLOSE (LENGTHWISE)" of the key assignment table stored in the ROM 301. Specifically, the function (cancel (clear) or return) of the operation key a6 as the operation function of the operation key b1 is assigned, the function (move down) of the operation key a5 as the operation function of the operation key b2 is assigned, the function (move up) of the operation key a1 as the operation function of the operation key b3 is assigned, the function (selection or determination) of the operation key a3 as the operation function of the operation key b4 is assigned, the function (move left) of the operation key a2 as the operation function of the operation key b5 is assigned, and the function (move right) of the operation key a4 as the operation function of the operation key b6 is assigned.

However, when it is assumed that the camera (landscape display) is selected as the application program of the mobile terminal device, an image of the camera preview display state is displayed on the display 30 as shown in FIG. 15(A). In this case, the key assignment is completed, and thus, for example, the operation key b3 (up) and the operation key b2 (down) serve as zoom adjusting keys of the camera, and the operation key b5 (left) and the operation key b6 (right) serve as brightness adjusting keys of the camera. Then, when the operation key (e.g., operation key b1 or operation key b4) corresponding to a "MENU" icon on the right side of FIG. 15(A) is pressed, the control unit 300 transfers the process to Step S31.

In Step S31, when a display instruction of the sub-menu is performed, the control unit 300 arranges and displays the display list (selection item 325) of the sub-menu in the widthwise (short-side) direction of the display 30 (see FIG. 15(B)) and transfers the process to Step S32.

In Step S32, a cursor (highlight bar, etc.) is moved in the display list of the sub-menu displayed on the display 30 using the operation key b3 (up) and the operation key b2 (down) to select a desired list, and the process is transferred to Step S33.

In Step S33, the selection is determined by pressing the determination key b4.

According to the mobile terminal device 1 configured as described above, there are the following advantages.

The sub-operation unit 307 in the turn-close state can have the operability of the cross key 15b in the folder open state, and thus it is possible to use the sub-operation unit 307 without the same incongruous feeling as the cross key 15b.

In addition, it is possible to reduce the space occupied by the sub-operation unit 307 as compared with the case where the exposed part is provided with the cross key, in the folder close state or the turn-close state, like the known example. Accordingly, the size of the case can be reduced, or the size of the screen (display unit) can be made larger.

In addition, in the case of the landscape display, the display list of the sub-menu displayed in the normal display state (open state: lengthwise) can be used as it is (no icon display, etc.). Accordingly, it is easy to see the display list of the sub-menu, and it is possible to reduce the variation in software.

In addition, it is possible to realize the key assignment which is easily visible according to the layout (lengthwise/widthwise) of the mobile terminal device. Accordingly, it is possible to perform the selection operation of the display list of the sub-menu without the incongruous feeling.

In addition, when the camera (turn-close landscape display) is selected as the application program, the operation key b3 (up) and the operation key b2 (down) can be used for changing up and down setting values (e.g., zoom), and the operation key b5 (left) and the operation key b6 (right) can be used for changing left and right setting values (e.g., brightness). Accordingly, improvement in operability can be expected.

The examples have been described above, but the invention is not limited thereto.

For example, in the above description, the determination whether or not the second display state (landscape display) is determined by the kind of the operated application, but the invention is not limited thereto. For example, the determination may be determined by a motion sensor provided in the mobile terminal device 1.

The key assignment function of the invention can be applied to another apparatus (device) as well as the mobile terminal device. For example, the key assignment function can be applied to a mobile wireless device provided with an antenna such as a PHS (personal Handy Phone System), a PDA (personal Digital Assistant), a portable navigation device, a note-type PC.

Figure 16:
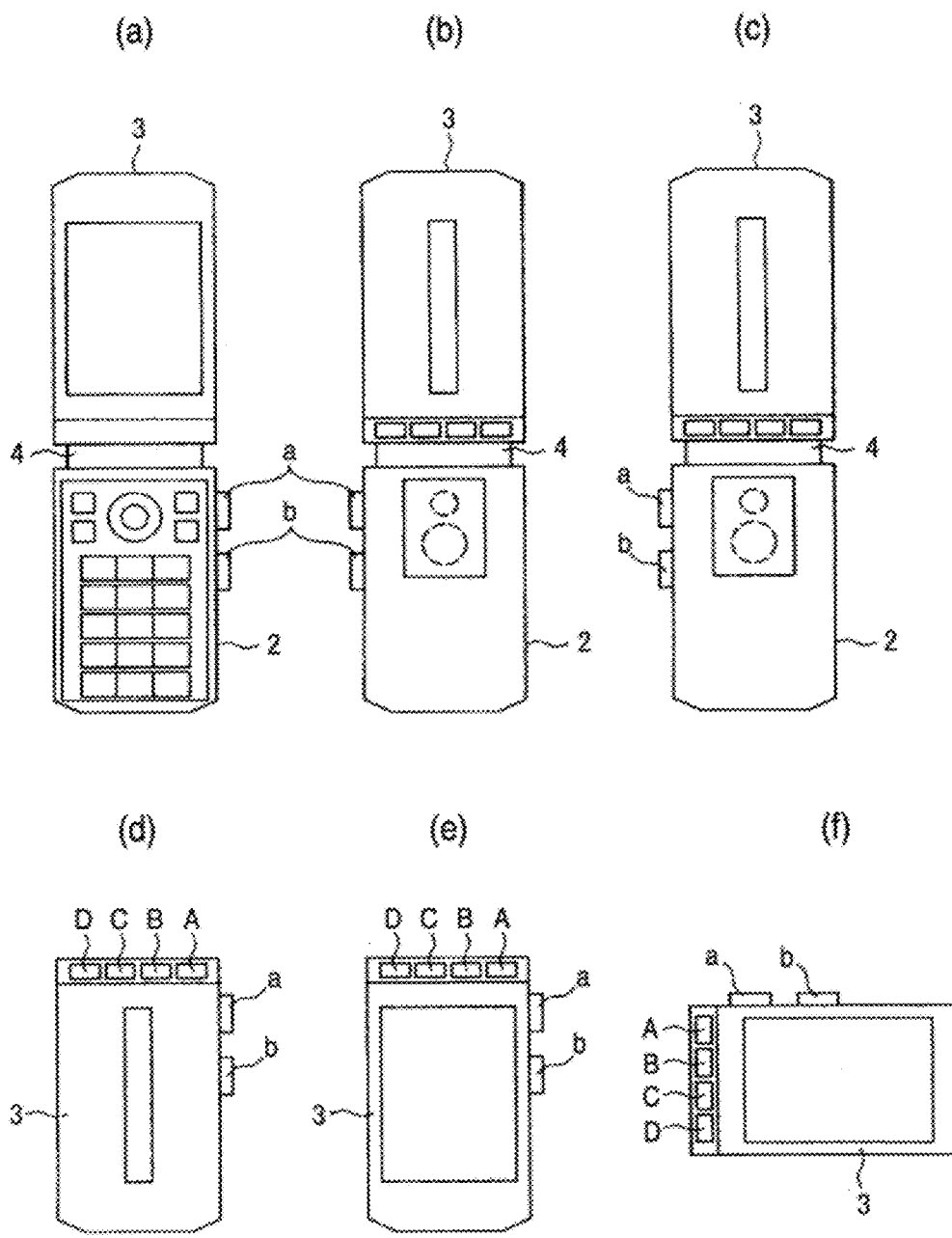
FIG. 16 is a view illustrating an example of an outward structure of the mobile terminal device according to an embodiment of the invention.

FIG. 16 is a view illustrating an example of an appearance structure of the mobile terminal device according to another embodiment of the invention. In FIG. 16, a mobile phone is exemplified as the mobile terminal device. In the mobile phone having a foldable type, a transmission case 1 in which a main body including a key device is mounted, and a reception case 2 in which a main display is mounted are coupled with each other by a 2-axis hinge mechanism 3. The foldable mobile phone has a case structure which can be changed to various shapes according the method of use (application).

In FIG. 16, FIG. 16(a) shows an example of setting the transmission case 1 and the reception case 2 in an open state and setting the main display in a two-facing state, FIG. 16(b) shows an example of viewing the transmission case 1 and the reception case 2 shown in FIG. 16(a) from the backside, FIG. 16(c) shows an example of turning the reception case 2 widthwise through the 2-axis hinge mechanism 3 and setting the main display in the two-facing state, from the state shown in FIG. 16(b).

FIG. 16(d) shows an example of setting the transmission case 1 and the reception case 2 in a cover-close state, FIG. 16(e) shows an example of turning the reception case 2 shown in FIG. 16(a) widthwise through the 2-axis hinge mechanism 4 so as to be set in a close state (hereinafter, referred to as a turn-close state), and FIG. 16(f) shows an example of setting the case shown in FIG. 16(e) in a transverse state. All of these case structures can be realized by the 2-axis hinge mechanism.

A numeric keypad, a cursor key, and a soft key shown in FIG. 16(a) and mounted on the transmission case 2 are defined as a first key group for convenience.

A key group of backside keys (A) to (D) used in the states of FIGS. 16(d) to 16(f) where the transmission case 2 and the reception case 3 are set in the close state, and side keys (a) and (b) which can be used in any state of the open state and the close state are defined as a second key group.

In this case, the backside keys (A) to (E) are a determination key, a right key, a left key, and a clear key, respectively, and manufacturer-unique specifications are assigned thereto. The side keys (a) and (b) are an up key and a down key, respectively, and manufacturer-unique specifications are assigned thereto.

Figure 17:
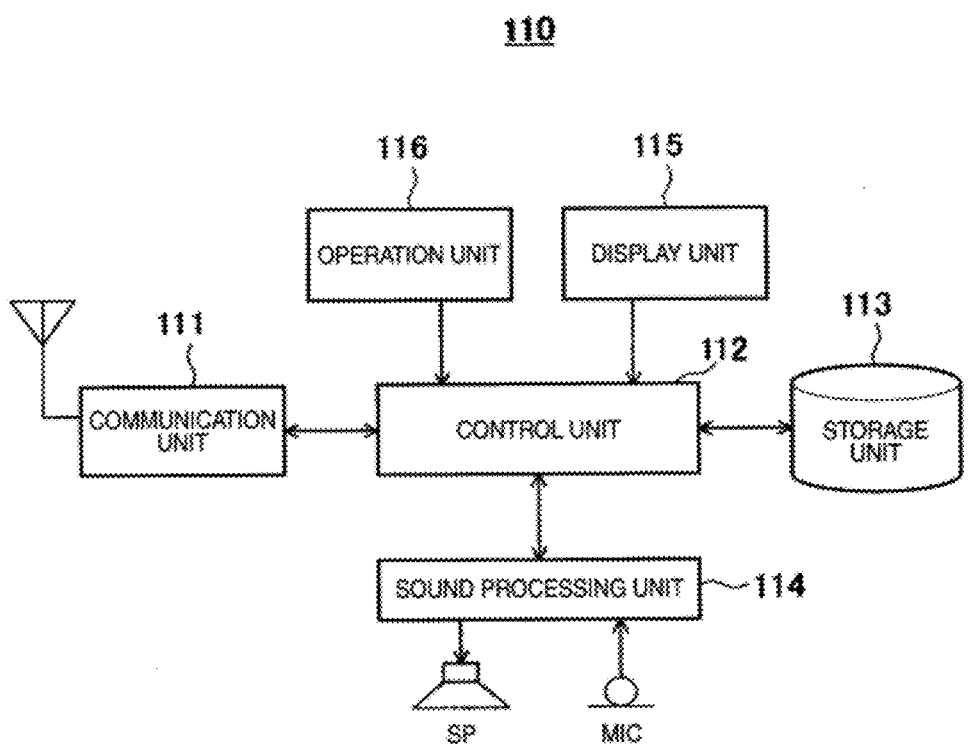
FIG. 17 is a block diagram illustrating an internal configuration of the mobile terminal device according to the embodiment of the invention.

FIG. 17 is a block diagram illustrating an internal configuration of the mobile terminal device according to the embodiment.

As shown in FIG. 17, a mobile phone 110 as the mobile terminal device includes a communication unit 111, a control unit 112, a storage unit 113, a sound processing unit 114, a display unit 115, and an operation unit 116.

The communication unit 111 transmits and receives wireless signals to and from a base station using a channel assigned by any one of base stations (not shown) through the public circuit.

When the control unit 112 receives a key operation during the executing of an application program operable by a key group assigned to the operation unit 116, the control unit 112 performs the process corresponding to the key.

In the storage unit 113, application programs are stored, and, for example, a nonvolatile storage device (nonvolatile semiconductor memory, hard disk device, optimal disk device, etc.), a random-access storage device (e.g., SRAM, DRAM), and the like are mounted.

The control unit 112 can execute a first application program (general application such as phone book) operable only by the key included in the first key group, and a second application program (e.g., common specification application) operable by any one of the first and second key groups. When any one of the plurality of keys is operated and the second application program is being executed, the control unit 112 generates a key signal according to the operated key. When the first application is being performed and the operated key is included in the first key group, the control unit 112 generates a key signal corresponding to the operated key. When the operated key is included in the second key group, the control unit 112 generates a key signal corresponding to any one of the first key group. The details will be described later.

The sound process unit 114 performs a process of a sound signal output from a speaker (SP) or a sound signal input to a microphone (MIC, hereinafter, referred to as a mike).

That is, the sound processing unit 114 amplifies sound input from the microphone, performs analog/digital conversion, additionally performs a signal process such as encoding, converts the signal to digital sound data, and output the sound data to the control unit 12.

The sound processing unit 114 performs signal process such as decoding, digital/analog conversion, amplification, and the like on the sound data supplied from the control unit 112, converts the sound data to an analog sound signal, and outputs the sound signal to the speaker.

The display unit 115 is configured using a display device, for example, a liquid crystal display panel and an organic EL (Electro-Luminescence) panel, and displays an image according to a video signal supplied from the control unit 112.

For example, the display unit 115 displays various information and images such as the phone number of transmission destination at the time of transmission, the phone number of a reception opponent at the time of reception, the contents of received texts or sent texts, date, time, the amount of battery remaining, the success or failure of transmission, and the standby screen.

A plurality of keys corresponding to the first key group and the second key group are assigned to the operation unit 116. When the keys are operated (pressed and released) by a user, the operation unit 116 generates a signal corresponding to the operation, and inputs the signal as user's instruction to the control unit 112.

Figure 18:
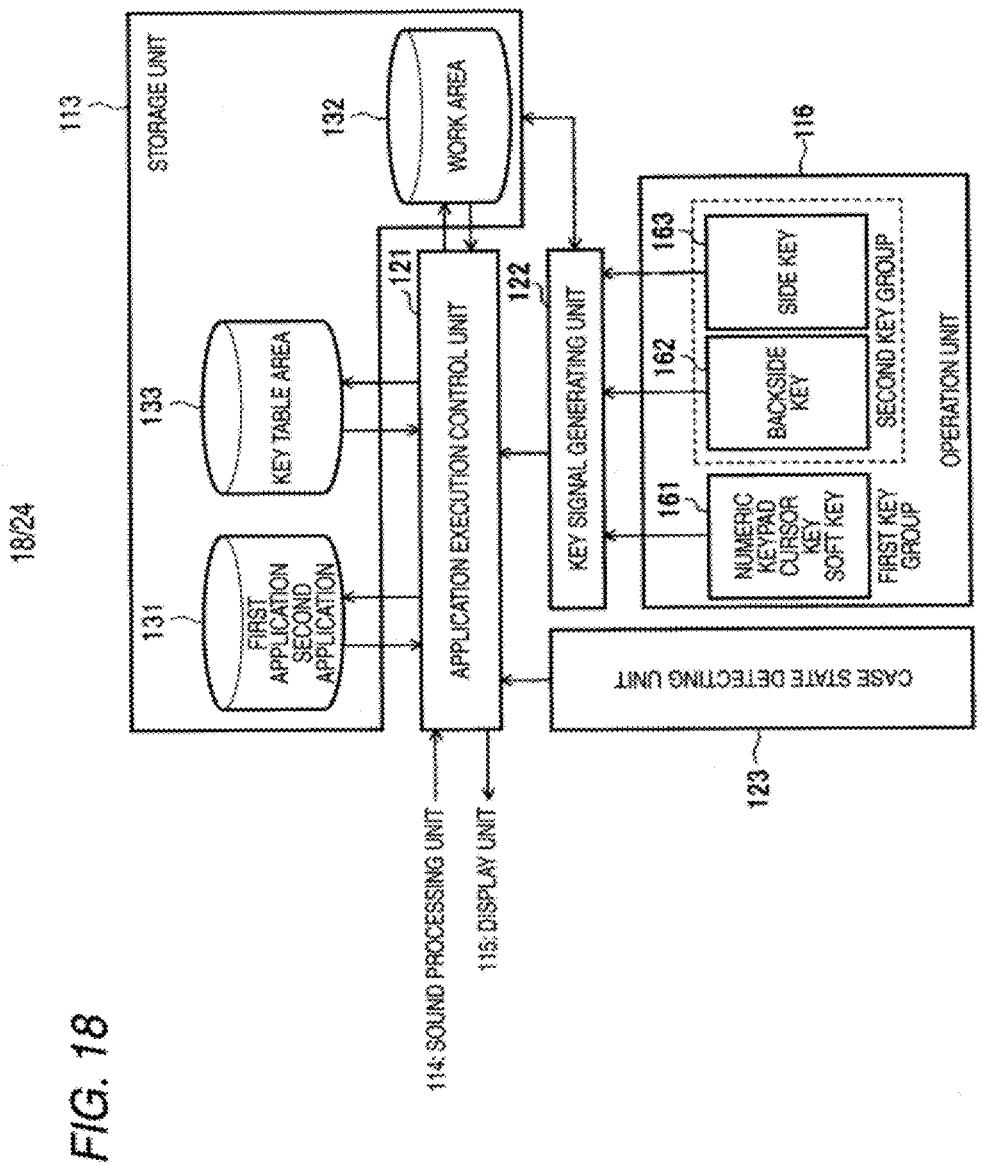
FIG. 18 is a functional-development block diagram illustrating an internal configuration of a control unit shown in FIG. 17.

As show in FIG. 18 by functional development of the internal configuration, the control unit 112 includes an application program execution control unit 121 (hereinafter, referred to as an application execution control unit 121), a key signal generating unit 122, and a case state detecting unit 123.

The application execution control unit 121 can execute all of the first application program (general application) operable only by the keys included in the first key group stored in the storage unit 13, and the second application program (common application) operable by any one of the first and second key groups.

When any one of the plurality of keys assigned to the operation unit 116 is operated and the second application program (general application program) is being executed, the key signal generating unit 122 generates a key signal corresponding to the operated key. When the first application program (common application) is being executed and the operated key is included in the first key group, the key signal generating unit 122 generates a key signal corresponding to the operated key. When the operated key is included in the second key group, the key signal generating unit 122 generates a key signal corresponding to any one key of the first key group.

The case state detecting unit 123 detects the case state (open state, close state, turn-close state) shown in FIG. 16, for example, by a sensor or the like installed in the vicinity of the 2-axis hinge mechanism 4, and transmits the case state to the control unit 12.

In the storage unit 113, a work area 132 in which the case state (open state, close state, turn-close state) or the kind (first/second) of the executed application is stored as a flag, and a key table area 133 are assigned and stored in addition to the program area 135 in which the first and second applications are stored.

Herein, "key table" is data in which key codes assigned according to conditions such as kinds of applications, case states, and pressing states (long press, short press) of keys are stored for each key switch disposed in matrix in the operation unit 116. In the operation unit 116, key switches 161, 162, and 163 are disposed corresponding to the first key group (numeric keypad, cursor key, soft key) and the second key group (unique backside key, side key).

Figure 19:
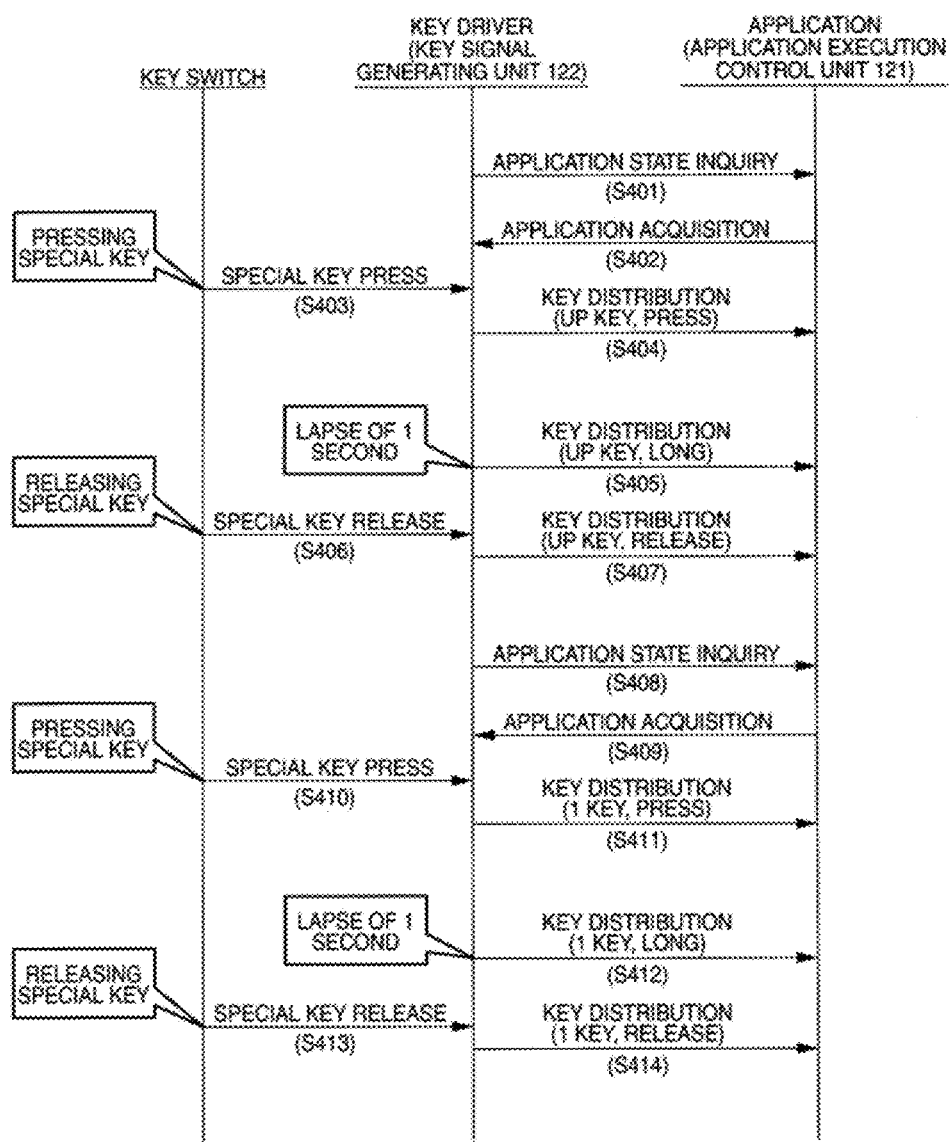
FIG. 19 is a sequence diagram illustrating an operation of the mobile terminal device according to the embodiment of the invention.

FIG. 19 is an operation sequence diagram for explaining an operation of the mobile terminal device according to another embodiment of the invention, in which each operation is shown in the key switch, the key driver, and the application. The key switch corresponds to the operation unit 16 (key matrix thereof) in FIG. 18, the key driver corresponds to the key signal generating unit 122, and the application is the program executed by the application execution control unit 121.

Hereinafter, a schematic operation of the mobile phone shown in FIG. 16 to FIG. 18 with reference to the operation sequence diagram shown in FIG. 19.

The key switches recognizable by the application have been already determined. For this reason, the key driver replaces key switches (e.g., A to b in FIG. 16) uniquely added by the manufacturer, with the known common keys so as to improve the operability due to considerations of the characteristics of the application, the disposition of the key switches, and the like, and distributes key information to the application. Herein, the key switches uniquely added by the manufacturer are called special keys for description.

First, the key driver sends for the executed application state from the application (S401), and acquires information on the kind of application (e.g., first application) (S401).

The driver periodically scans the key switches disposed in the matrix, thereby monitoring variation of current value (voltage value). The driver acquires coordinates in the matrix by a special key press signal detected when the user presses the special key, refers to the key table area 133 stored in the storage unit 13 on the basis of the coordinates, obtains the corresponding key information, and distributes it to the application (S403).

Accordingly, the application can recognize the operation recognizable by the first application, for example, "PRESS UP KEY", and starts the corresponding process (S404).

Subsequently, when the user releases the pressing of the special key, the driver acquires a special key release signal (default-set current value) from the key switch and distributes the corresponding key information to the application (S406).

Then, the application can recognize the operation as "RELEASE UP KEY" recognizable by the executed application (S407).

In addition, when the special key press signal continues, for example, 1 second or more, the application can recognize the key signal as "LONG PRESS UP KEY" (S405).

When the application recognizes the key signal, the application performs the corresponding process.

The executed application may be changed from the first application (general application) to the second application (manufacturer-specification application) or another first application. The check of the kind of the application can be known by frequently inquiring the kind of the executed application to the application by the key driver (S408, S409).

The key driver changes the used key table according to the inquiry result. The details will be described later.

Also, in this case, the key driver performs the key distribution by scanning the key switches in the same manner. That is, the key driver receives the special key press signal and performs the key distribution (S410, S411), and the key driver receives the special key release signal and performs the key distribution (S413, S414). However, the key signal distributed at this time is changed from "UP KEY" to a signal "1 KEY". The application recognizes that the operations of "SHORT PRESS 1 KEY" and "LONG PRESS 1 KEY" are performed.

When the special key press signal continues for 1 second or more, the application can recognize the signal as a long press of the 1 key (S412).

That is, when the kind of the executed application is changed to a state of expecting the input of the 1 key, the key input according to each application can be performed by changing the assignment of the special key to the known numeric keypad.

Specifically, in the foldable mobile phone shown in FIG. 16, when the operation is performed in the close state, the numeric keypad or the up, down, left, and right keys cannot be used. Accordingly, the up, down, left, and right operations cannot be performed in the close state. Thus, the special keys (A to D in FIG. 16) that can be used even in the turn-close state are added, and the keys are assigned to the up, down, left, and right cursor key operations. Accordingly, new operations can be performed.

Figure 20:
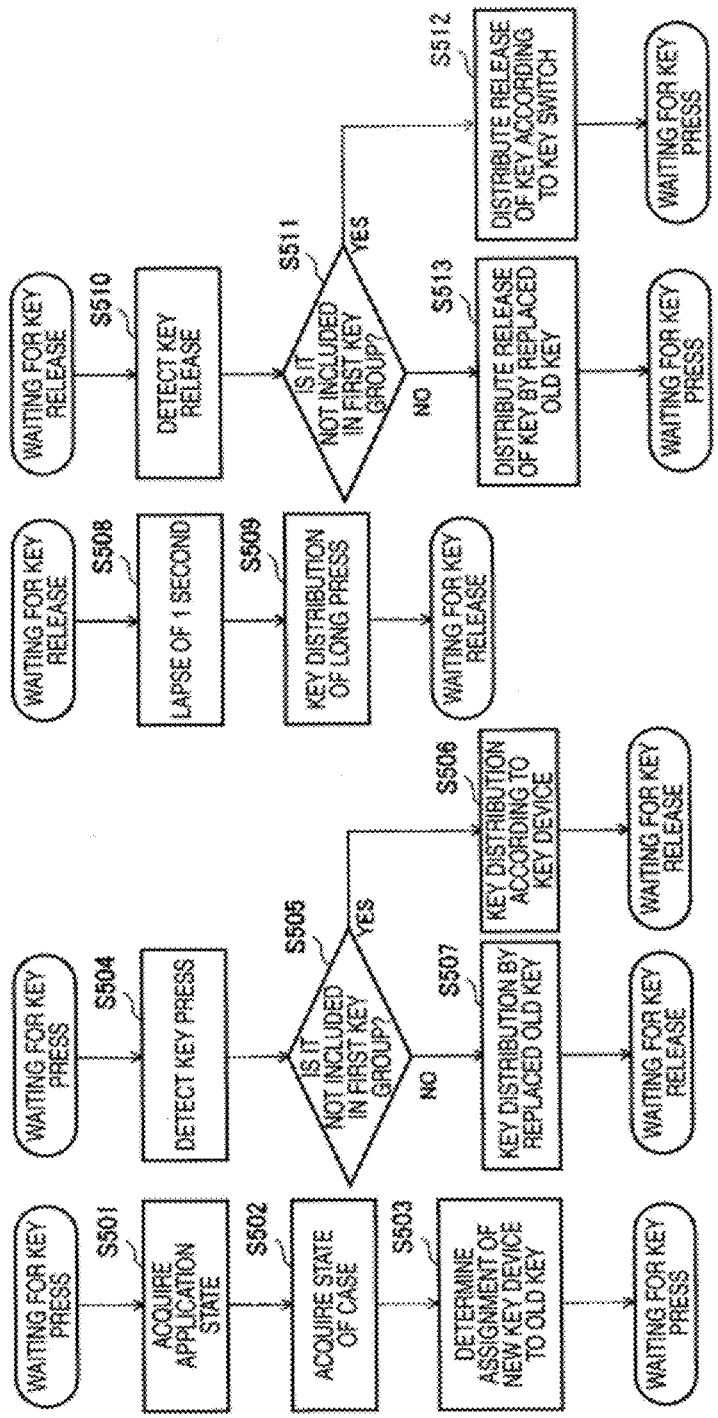
FIG. 20 is a flowchart illustrating an operation of the mobile terminal device according to the embodiment of the invention.

FIG. 20 is a flowchart illustrating the operation of the mobile terminal device according to another embodiment of the invention. Hereinafter, the operation of the mobile terminal device according to another embodiment of the invention shown in FIG. 16 to FIG. 18 will be described in detail with reference to the flowchart shown in FIG. 20.

First, the application execution control unit 121 distinguishes the executed application state (kind) and sets a flag for the work area 132 in the storage unit 13. The key signal generating unit 122 acquires the application state with reference to the flag (S501), and acquires the case state (open state, close state, turn-close state) transmitted from the case state detecting unit 123 through the application execution control unit 121 (S502).

Subsequently, the key signal generating unit 122 determines the assignment of the special key to the old key, and selects the key table prepared according to the assignment from the key table area 133 in the storage unit 13 (S503), and the state is set to wait for a key press.

For example, as shown in FIG. 21, the selected key table means that the relationships are defined among the kinds of the applications (general application, radio, television lengthwise, television widthwise), the case states (open state, close state, turn-close state), and the old key assigned to each of a backside determination key, a backside right key, a backside left key, a backside clear key, and side up and down keys uniquely mounted as the special keys (second key group) according to the long/short press of the keys.

Next, a case where the executed application is the first application will be described by way of example. When the key press is detected (S504), the key signal generating unit 122 determines whether the pressed key switch is not included in the second key group (special key), that is, it is included in the first key group (S505).

When it is determined that the pressed key switch is not the special key (S505: YES), the key information defined according to the key switch is distributed to the application execution control unit 121 (application) with reference to the key table stored in the key table area 133 in the storage unit 13 (S506).

Meanwhile, when it is determined that the pressed key switch is the special key (S505: NO), the old key information (corresponding to the key of the first key group) replaced by referring to the key table stored in the key table area 133 in the storage unit 13 is distributed to the application execution control unit 121 (application), and the state is set to wait for a key release (S507).

It can be determined whether or not it is the special key by the coordinate values of the key switch acquired by the key scanning.

Next, the key signal generating unit 122 monitors the press time of the key by a timer (not shown) or the like, and determines the cases where 1 second or more is elapsed as long press of the key (S508), and distributes the corresponding key information to the application execution control unit 121 with reference to the key table stored in the key table storage unit 133 in the storage unit 13, and the state is set to wait for a key release again (S509).

Subsequently, the key signal generating unit 122 detects the key release (S510), and determines whether or not the released key switch is included in the first key group on the basis of the coordinates, that is, performs the determination of the special key (S511).

When the released key is a key of the first key group and is not the same special key as the previously pressed key switch (S511: YES), the key information defined according to the key switch is distributed to the application execution control unit 121 (application) with reference to the key table stored in the key table area 133 in the storage unit 13 (S512). When the released key is the special key (S511: NO), the old key information (corresponding to the key of the second key group) replaced by referring to the key table stored in the key table area 133 in the storage unit 13 is transferred to the application execution control unit 121 (application) (S513).

FIG. 21 is a table illustrating an example of key assignment used as the mobile terminal device according to another embodiment of the invention.

As shown in FIG. 21, it is detected that the first application, that is, the general application is being executed (top visible) and the case state detecting unit 123 detects that the case in the turn-close state, the application execution control unit 121 can recognize the uniquely added special keys (second group key) A to D as the old keys (first group keys) such as the determination key, the right key, the left key, and the clear key with short press and long press, and similarly can recognize the side up key (a) and the side down key (b) as the up key and the down key with short press and long press.

When the FM radio application and television application (lengthwise) are being performed and the case state detecting unit 123 detects that the case is in the open state, the application execution control unit 121 recognizes the backside right key of the uniquely added special key as the left key and recognizes the backside left key as the right key along with the short press and long press, and they may be used, for example, for changing the channel. In addition, the application execution control unit 121 recognizes the side up key as the up (side key) key and recognizes the side down key as the down (side key) key, and they may be assigned, for example, for volume up and down.

The representation of the backside clear key as SPECIAL does not indicate the conversion to the old key, but indicates that a special process is necessary such as using in case of performing Web connection.

When the case state detecting unit 123 detects that the case is in the turn-close state, the application execution control unit 121 recognizes the uniquely added special keys A to E as the determination key, the right key, the left key, and the clear key (however, SPECIAL in case of long press) along with the short press and long press, and can recognize the side up key (a) and the side down key (b) as the up key and the down key with all of short press and long press.

The television application (widthwise arrangement) basically has the same assignment as the lengthwise arrangement, except that the corresponding up, down, left, and right are opposite.

As described above, according to the mobile terminal device according to another embodiment of the invention, when the unique key switches are mounted to be made newly operable, the key switches cannot be recognized in the common application. However, it is possible to obtain excellent operability considering the mounting position of the manufacturer-uniquely added key switches by changing the assignment in the old key arrangement according to the common application, due to the unique key switches.

In addition, the user acquires the above-described first application (general application) by Web connection and download from a server, in addition to the application previously stored in the program area 131 in the storage unit 13 (the control unit 12 acquires the application through the public communication network by the communication unit 11), for example, a navigation program, a game, and the like are included therein.

That is, generally, the general application such as the navigation program or the game corresponding only to the general keys does not correspond to the terminal unique special keys (second group key), so as to operate even in any kind from any manufacturer (however, recently, in terms of the side keys in the second group keys, the general application may correspond thereto since they are equipped as standard). According to the invention, it is possible to perform the operation also by the non-corresponding second group keys. Since the second group keys are not exposed in "a state where the display is visible but the second group keys are not exposed" such as the turn-close state, the operation cannot be originally performed. However, according to the invention, it is possible to cope with a user's minor demands since the operation can be performed. It is not necessary that the general application is provided with the key distribution table considering key configurations of the various terminals from many companies from the point of view of a provider (application vendor) supplying such general applications, and thus work burden of the application vendor is drastically reduced. Accordingly, many general applications can easily circulate on the market, and further sales of terminals may be activated.

Next, an example of a case where a large number of keys of the second key group (special key) cannot be provided will be described. As an example, it is assumed that the mobile terminal device shown in FIG. 16 is provided with only three keys (A), (B), and (C) as the backside keys, and the key (D) is not provided.

Figure 23:
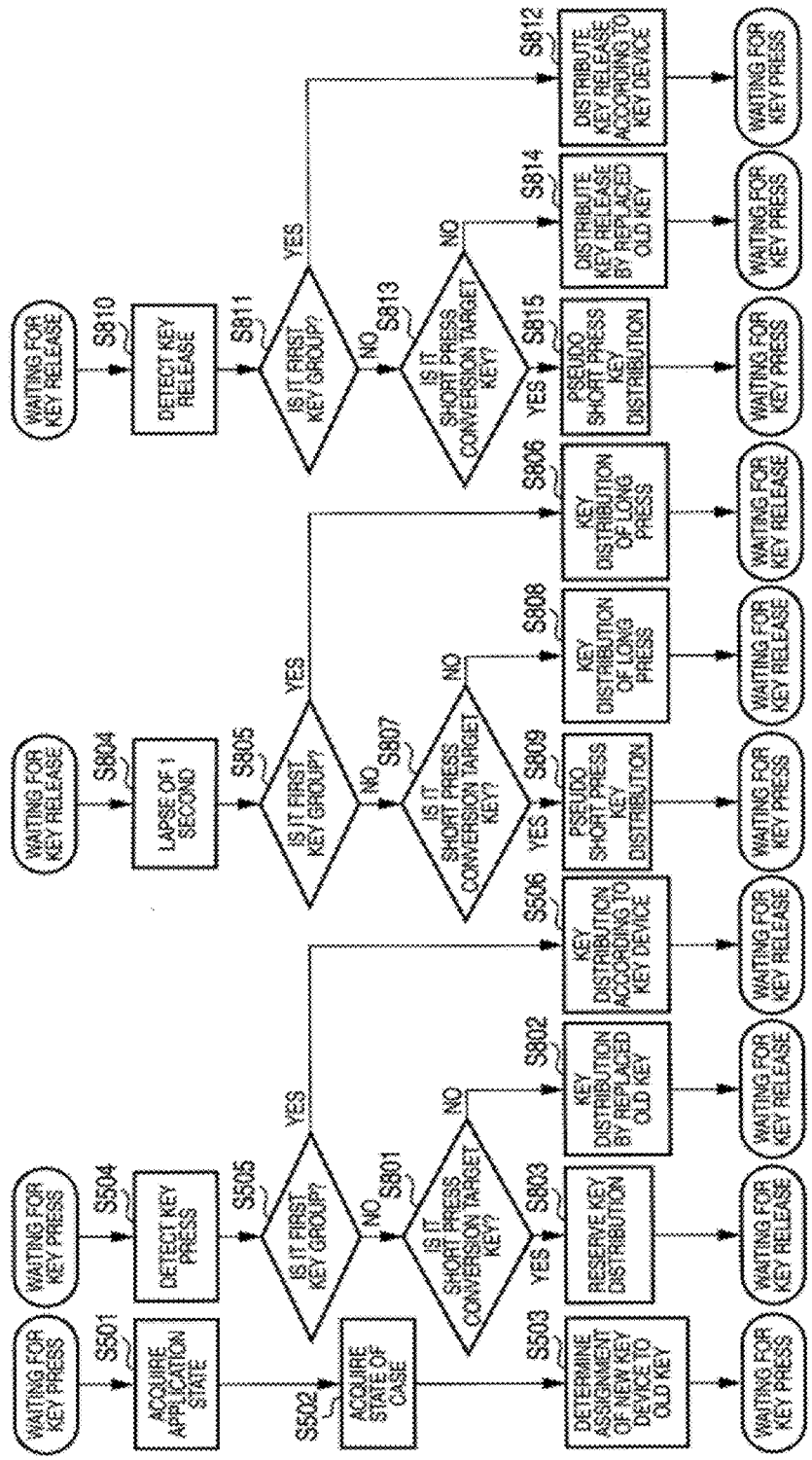
FIG. 23 is a flowchart illustrating an operation of the mobile terminal device according to another embodiment of the invention.

In the embodiment, a figure of a case configuration in this case is omitted since the configuration is nothing more than removing the key (D). The other configuration of each processing unit is the same, and thus is not particularly shown. Hereinafter, a process sequence will be described with reference to FIG. 22 to FIG. 24. In FIG. 23, the same step numbers are assigned to the same steps as that in FIG. 20.

In the embodiment, as shown in FIG. 22, a case of operating the general application and a case of operating the television application will be described as an example of the general application (first application) by way of example. As compared with the example shown in FIG. 21, the key (D) is not provided. Accordingly, a function key of "CLEAR" is missing. Thus, the function of "CLEAR" is assigned to the backside key (A) as a short press conversion target key, with respect to long press.

Figure 24:
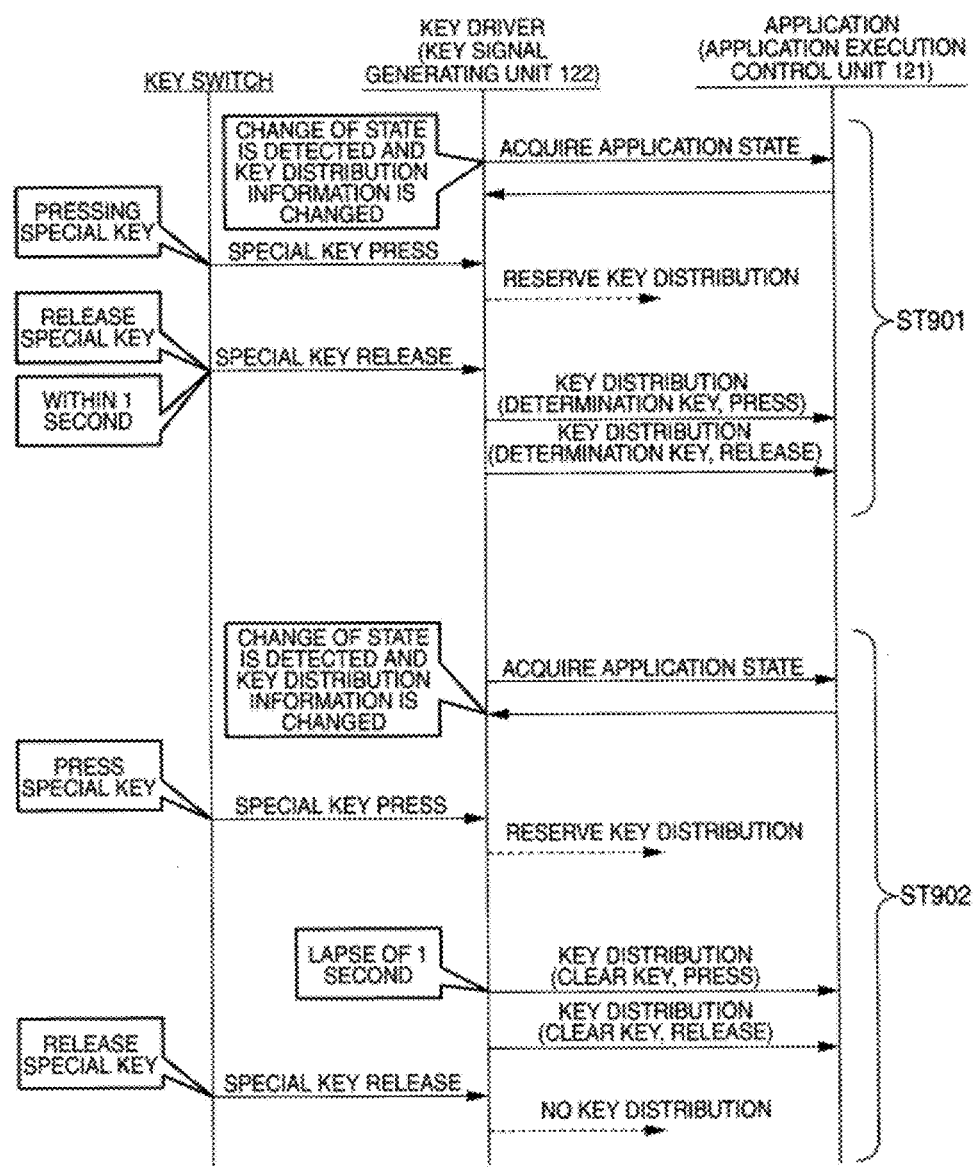
FIG. 24 is a sequence diagram illustrating an operation of the mobile terminal device according to another embodiment of the invention.

FIG. 23 is a flowchart illustrating the operation of the mobile terminal device according to the embodiment, and FIG. 24 is a sequence diagram illustrating the operation of the mobile terminal device according to another embodiment of the invention.

First, the application execution control unit 121 and the key signal generating unit 122 grasp the executed application state (kind) (S501). In addition, the case state (open state, close state, turn-close state) transmitted from the case state detecting unit 123 is acquired through the application execution control unit 121 (S502).

Subsequently, as described the example shown in FIG. 20 the key signal generating unit 122 determines the assignment of the special key to the old key, selects the key table (table shown in FIG. 22 as an example) prepared according to the assignment from the key table area 133 (S503), and the state is set to wait for a key press. When the executed application is the second application, necessary functions are individually assigned to the special key such as the backside key on the basis of specifications of the manufacturer.

Next, the case where the executed application is the first application will be described by way of example. When key press is detected (S504), the key signal generating unit 122 determines whether or not the pressed key switch is included in the first key group (S505)

When it is determined that the pressed key switch is included in the first key group, that is, not the special key (S505: YES), the key information defined according to the key switch is distributed to the application execution control unit 121 (application) with reference to the key table stored in the key table area 133 in the storage unit 13 (S506).

Meanwhile, when it is determined that the pressed key switch is the special key (S505: NO), it is determined whether or not the pressed key is the backside key (A), that is, the short press conversion target key (predetermined key) (S801).

When it is determined that the pressed key switch is not the backside key (A) (S801: NO), the old key information (corresponding to the keys of the first key group) replaced by referring to the key table stored in the key table area 133 in the storage unit 13 is distributed to the application execution control unit 121 (application), and the state is set to wait for release (S802). When the pressed key switch is the backside key (A) (S801: YES), the generation and the distribution of the key signal at this time are not performed and are reserved (S803), and the state is set to wait for release (S802).

In addition, it can be determined whether or not the pressed key is the special key, and the short press conversion target key (predetermined key) by the coordinate value of the key switch acquired by the key scan.

Next, the key signal generating unit 122 monitors the press time of the key by a timer (not shown) or the like, and determines a case where 1 second or more is elapsed as a long press of the key (S804). Then, it is determined whether or not the pressed key is the first group key (S805), and it is determined whether or not the pressed key is the short press target key (S807). When the pressed key is the first group key, that is, not the special key (S805: YES) or when the pressed key is the special key but is not the short press conversion target key (S806: NO), the corresponding key information is distributed to the application execution control unit 121 with reference to the key table stored in the key table area 133 in the storage unit 13, and the state is set to wait for key release again (S806, S808). Meanwhile, when the pressed key is the special key and the short press conversion target key (S807: YES), a short press signal of the corresponding key is generated and distributed with reference to the key table as a pseudo short press key signal (S809). When the short press conversion target key is released without being pressed for 1 second or more, a short press signal of the first group key corresponding to long press of the short press conversion target key in the key table is generated and distributed, and the state is not set to wait for release, considering the short press conversion target key as released.

When the key signal generating unit 122 detects the release of the key before the lapse of 1 second (S810), the key signal generating unit 122 determines whether or not the released key switch is included in the first key group on the basis of the coordinate thereof (S811).

When the released key is the key of the first key group and is not the same special key as the previously pressed key switch (S811: YES), the key information defined according to the key switch is distributed to the application execution control unit 121 (application) with reference to the key table stored in the key table area 133 in the storage unit 13 (S812). When the released key is the special key (S811: NO), it is determined whether or not the released key is the short press target key (S813). When the released key is the short press target key (S813: YES), a short press signal of the first group key corresponding to the short press of the short press conversion target key is generated with reference to the key table stored in the key table area 133 in the storage unit 13, and is distributed to the application execution control unit 121 (application) (S815).

That is, in case of the key table shown in FIG. 22, as shown in FIG. 24, the pressing of the backside key (A) is released without continuing for 1 second or more, a signal of the "DETERMINATION" key is generated and distributed (ST901). When the pressing continues for 1 second or more, a signal of the "CLEAR" key is generated and distributed (ST902).

As described above, according to the mobile terminal device according to the embodiment of the invention, when the unique key switch are mounted, it is possible to obtain excellent operability considering the mounting position of the manufacturer-uniquely added key switches, even for the general application that cannot recognize the key switch. Particularly, even when there are a small number of unique key switches, it is possible to associate the keys having different functions with each other in the short press and the long press. That is, even when the first group keys cannot satisfactorily be used like in the turn-close state, it is possible to perform various operations by the second group keys.

In addition, during the executing of the first application program (general application), for the operation of the short press conversion target key, the corresponding key signal for the first time when the release within 1 second occurs or the pressing continues for a predetermined time or more, without generating and distributing the key signal corresponding to the occurrence of the short press in the application at the time of the occurrence of the pressing of the short press conversion target key. Accordingly, in the step where the key signal corresponding to the long press is generated and distributed, the key signal corresponding to the short press has occurred already. Accordingly, there are no problems due to confusion in the process of the application.

The above-described first application (general application) is the application program which can be downloaded from the server and is usable irrespective of manufacturers, and the application program previously mounted as the common specifications with other manufacturers, in addition to the application program previously stored in the storage unit 13, like the former embodiment, and there is an advantage that a specific configuration is not necessary in the configuration of the first application.

In any embodiment of the invention, the invention can be embodied if at least one of the keys constituting the second key group and the short press conversion target key is provided, but a plurality of keys may be provided.

According to the embodiment of the invention, the mobile phone has been exemplified as the mobile terminal device, but the mobile terminal device is not limited to the mobile phone and can be applied to a PDA (Personal Digital Assistants), a game console, and the like in the same manner.

All the constituent block functions of the mobile terminal device of the invention may be realized by software, or at least a part thereof may be realized in hardware. For example, the data processes in the application execution control unit 121, the key signal generating unit 122, and the case state detecting unit 123 may be realized on a computer by one or more programs, and at least a part thereof may be realized in hardware.

INDUSTRIAL APPLICABILITY

In the invention, in the second state, the operation functions are assigned to the sub-operation unit provided at the exposed part, according to the up and down operation keys and the left and right operation keys in the main operation unit in the first state. Therefore, the case can be reduced or the display screen can be made larger, the operation having the same functions as those of the first state can be performed even in the second state. Accordingly, it is possible to perform the key operation without the incongruous feeling.

According to the invention, it is possible to realize a display of the selection items (sub-menu, etc.), a scroll operation, and the like with an operation having no incongruous feeling, without increasing the size of the case (mobile terminal device) or increasing the production cost.

According to the invention, even in case of the application programs having the common specifications, the key control, which makes the best use of the characteristics of the manufacturer-uniquely added keys, is performed, and differentiation from other companies is achieved due to the operability being improved. Therefore, the industrial applicability of the invention is very high due to the above-described particular advantages.

The invention claimed is:

1. A mobile terminal device comprising:
an operation unit that has a first key group including a plurality of keys, and a second key group consisting of at least one key not included in the first key group;
a control unit that performs a process corresponding to a key when receiving a key operation during the executing of an application program operable by the operation unit; and
a storage unit that stores the application program,
wherein the control unit is capable of executing all of a first application program operable only by the plurality of keys included in the first key group and a second application program operable by any one of the first and second key groups,
wherein when the second application program is executed and any one key of the operation unit is operated, the control unit generates key signals corresponding to the operated keys and processes the key signals by the second application program,
wherein when the first application program is executed and any one key of the operation unit is operated, the control unit generates a key signal corresponding to the operated key and processes the key signal by the first application program when the operated key is the key included in the first key group, and the control unit generates a key signal corresponding to any one key of the first key group and processes the key signal by the first application program when the operated key is the key included in the second key group,
wherein when any one of the keys included in the second key group is pressed during the executing of the second application program, the control unit generates a second key signal at the time of releasing the pressing after occurrence of the key pressing, and
when any one of the keys included in the second key group is pressed during the executing of the first application program, the control unit generates a first key signal after the lapse of a first predetermined time from the time of occurrence of the key pressing without releasing the pressing.

2. The mobile terminal device according to claim 1,
wherein the storage unit stores and associates any one of first key signals corresponding to the keys included in the first key group with a respective one of the keys included in the second key group, and
wherein when the first application program is executed and any one key of the second key group is operated, the control unit generates a key signal corresponding to the operated key with reference to the storage unit.

3. The mobile terminal device according to claim 1, further comprising
a communication unit connectable to a public communication network,
wherein the control unit acquires the first application program by the communication unit, and stores the first application program in the storage unit.

4. The mobile terminal device according to claim 1, wherein when any one of the keys included in the second key group is operated during the executing of the first application program and the operated key is a predetermined key, the control unit generates a key signal after the lapse of a second predetermined time from the time of releasing the key pressing or starting the key pressing, without generating the key signal at the time of starting the key pressing as an operation start.

5. The mobile terminal device according to claim 4, wherein the control unit controls the key signal generated when the pressing of the predetermined key is released within a third predetermined time from the time of the pressing start of the key, and the key signal generated when the pressing of the predetermined key is released after the lapse of the third predetermined time from the time of the pressing start, corresponding to the keys included in the first key group, to be different from each other.

\* \* \* \* \*